(12) United States Patent
Nakano

(10) Patent No.: US 6,879,687 B1
(45) Date of Patent: Apr. 12, 2005

(54) APPARATUS FOR SENDING A RINGING SIGNAL AND DATA WITH REDUCED IMPULSE NOISE

(75) Inventor: Takashi Nakano, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 552 days.

(21) Appl. No.: 09/672,462

(22) Filed: Sep. 28, 2000

(30) Foreign Application Priority Data

Nov. 5, 1999 (JP) .......................................... 11-314596

(51) Int. Cl.[7] .............................................. H04M 3/00
(52) U.S. Cl. ..................................... 379/418; 379/252
(58) Field of Search ................................ 379/179, 372, 379/418, 88.19–88.23, 82, 207.08–207.09, 252, 375.01, 376, 93.03

(56) References Cited

U.S. PATENT DOCUMENTS 4,551,581 A  * 11/1985  Doughty ................ 379/142.01
6,115,469 A  *  9/2000  Dalal et al. ................. 379/418

FOREIGN PATENT DOCUMENTS

| JP | 61-500089 |   | 1/1986 |   |   |
|----|-----------|---|--------|---|---|
| JP | 62078941 A | * | 4/1987 | ............ | H04M/3/06 |
| JP | 362078941 A | * | 4/1987 | ................ | 379/418 |
| JP | 03-088464 A |   | 4/1991 |   |   |
| JP | 09-162975 A |   | 6/1997 |   |   |

* cited by examiner

*Primary Examiner*—Rexford Barnie
*Assistant Examiner*—Alexander Jamal
(74) *Attorney, Agent, or Firm*—Katten Muchin Zavis Rosenman

(57) ABSTRACT

An apparatus which produces a ringing signal for a telephone system, effectively suppressing impulse noises. A ringing voltage generator produces a ringing voltage. A ringing signal sending unit sends a ringing signal to the called telephone terminal over the subscriber line by outputting the ringing voltage intermittently. This ringing signal consists of ringing periods and silent periods which will appear alternately with a prescribed duty cycle. One of those silent periods is used by a data transfer unit used to transport data to the called terminal. A feed impedance setting unit provides a feed voltage with higher source impedance. A feed impedance selection unit selects a low-impedance feed voltage in the one of the silent periods during which a data transfer is performed, and selects a high-impedance feed voltage in the other silent periods during which no data transfer is scheduled.

8 Claims, 22 Drawing Sheets

FIG. 8(A)

(A) RINGING SIGNAL SENDING APPARATUS 10

|  | RELAY SWITCHES SW1 AND SW2 | RELAY SWITCHES SW3 AND SW4 |
|---|---|---|
| RINGING | ON | ON |
| LOW-IMPEDANCE FEED | OFF | DON'T CARE |
| HIGH-IMPEDANCE FEED | ON | OFF |

FIG. 8(B)

(B) RINGING SIGNAL SENDING APPARATUS 10a

|  | RELAY SWITCHES SW1 AND SW2 | RELAY SWITCHES SW3 AND SW4 |
|---|---|---|
| RINGING | ON | DON'T CARE |
| LOW-IMPEDANCE FEED | OFF | ON |
| HIGH-IMPEDANCE FEED | OFF | OFF |

APPARATUS FOR SENDING A RINGING SIGNAL AND DATA WITH REDUCED IMPULSE NOISE

BACKGROUND OF THE INVENTION

1. Field of the Invention

The present invention relates to a ringing signal sending apparatus, and more particularly to an apparatus for sending a ringing signal to inform the called terminal of the presence of an incoming call addressed to it.

2. Description of the Related Art

Telephone exchanges employ subscriber interface units to provide various control functions over local loop connections, such as handling of incoming and outgoing calls to/from customer premises equipment, or telephone. Sending a ringing signal (or call signal) is one of those subscriber interface functions. The subscriber interface unit notifies a remote telephone set that there is an incoming call addressed to it, by sending a predetermined pattern of ringing and silent intervals.

FIG. 20 shows the duty cycle and waveform of a typical ringing signal. The ringing signal is an alternate current (AC) signal with a frequency of 20 to 25 Hz superimposed on a certain direct current (DC) bias voltage (e.g., −48 volts). The very first cycle of ringing and silence is referred to as the "initial ringing cycle"; similar cycles that follow are called the "cadence ringing cycles." The illustrated signal has a duty cycle of 1.2-second ringing and 2.8-second silence for the initial ringing cycle, and 1.2-second ringing and 3.0-second silence for the cadence ringing cycles. The subscriber interface unit supplies the called telephone set with a ringing signal with such a cyclic pattern.

The silent period in the initial ringing cycle is often used to provide various service functions, during which a data transfer path is established between the called telephone set and the local exchange. For example, the customer can see the caller's phone number displayed on his/her telephone set when an incoming call is signified. This service, known as the "caller number display" or "calling line identification presentation" (CLIP), exploits the silent period in the initial ringing cycle to transfer the originating phone number information.

FIG. 21 shows subscriber interface units, where the function of sending a ringing signal is illustrated in a simplified form. Here, a plurality of subscriber interface units 101-1 to 101-n are installed in a telephone exchange 100. The subscriber interface unit 1011 comprises a relay switch 111, a feed voltage source 112, and a ringing voltage source 113. The illustrated subscriber interface unit 101-1 supports only one channel for simplicity. In the actual implementations, however, a single subscriber interface unit serves multiple telephone channels (e.g., 32 channels).

The terminal "a" of the relay switch 111 is connected to the feed voltage source 112, which produces a feed voltage of −48 volts. The terminal "b" is connected to the ringing voltage source 113. The terminal "c" is connected to a telephone set 20 through the ring wire (also called "B wire") of its local loop. The terminal "e" is grounded. The relay switch 111 is actuated by a driving command supplied to its terminal "d." The tip wire (also called "A wire") extending from the telephone set 20 is grounded at the subscriber interface unit 101-1.

Suppose here that the telephone exchange 100 is to send a ringing signal to the telephone set 20. This process is initiated by giving a driving command to the relay switch 111. The armature contact (sw) of the relay switch 111 then moves to the "b" side. This creates a circuit that connects the ring wire with the ringing voltage source 113, thus sending out a ringing signal to the telephone set 20.

Referring to FIG. 22, a conventional subscriber interface unit 101, which is configured as above, is electrically connected to a telephone set 20 via tip and ring wires. When modeling the telephone set 20 and subscriber line for transient analysis, one should consider their inductance and stray capacitance. The lower half of FIG. 22 shows such parasitic components. In this model, the telephone set 20 is represented as an inductor L21 and a capacitor C21 connected in series between the tip and ring wires. The tip wire itself is modeled by series inductors L22 and L23 and a capacitor C22 representing its stray capacitance to the ground. Likewise, the ring wire is modeled by series inductors L24 and L25 and a capacitor C23 representing its stray capacitance to the ground. Further, there is a parallel capacitor C24 between the tip and ring wires.

The above-described parasitic components may cause noise interference, particularly when the subscriber interface unit 101 is sending a ringing signal. At every transitional point between a ringing period and a silent period, it is likely that the parasitic inductors produce counter electromotive forces, and the parasitic capacitors discharge their electric energy, thus causing impulse noises. Since the subscriber interface unit 101 simultaneously handles many telephone channels, such impulse noises developed on a channel may cause interfere with its adjacent channels via closely arranged wiring patterns on the print circuit board. Frequent impulses on a channel would be heard by the user of an adjacent channel as unpleasant crosstalk noises.

As previously mentioned, a single telephone exchange 100 is designed to accommodate many subscriber interface units 101. This means that impulse noises developed on a certain unit could reach the adjacent units through the wiring on the backplane, causing adverse effects on their operation.

As described earlier in FIG. 20, the telephone exchange 100 establishes a path to a remote telephone set 20 to transport data during the silent period in the initial ringing cycle. Conventionally, however, the hardware of the subscriber interface unit 101 is configured to maintain the established path in the cadence ringing cycles that follow. In other words, an unnecessary path is activated during such silent periods that have no data to send. This brings about a practical problem. To activate a data transfer path is to reduce the impedance of the loop. This low loop impedance helps the development of larger impulse noises, making it difficult to suppress them.

SUMMARY OF THE INVENTION

Taking the above into consideration, an object of the present invention is to provide a ringing signal sending apparatus which improves the quality of communication signals by effectively suppressing the development of impulse noises.

To accomplish the above object, according to the present invention, there is provided an apparatus for sending a ringing signal to notify a called terminal of the presence of an incoming call addressed thereto. This apparatus comprises the following elements: a ringing voltage generator which generates a ringing voltage; a ringing signal sending unit for sending out a ringing signal over a subscriber line by outputting the ringing voltage with a predetermined duty cycle of a ringing period and a silent period; a data transfer unit which performs a data transfer to the called terminal over the subscriber line during one of the silent periods; a feed impedance setting unit which provides a high-impedance feed voltage; and a feed impedance selection unit which selects a low-impedance feed voltage in the one of the silent periods during which the data transfer is performed, and selects the high-impedance feed voltage in the other silent periods during which no data transfer is performed.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIGS. 8(A) and 8(B) are diagrams which clarify the difference between the two switch control methods;

FIG. 8(A) shows a first set of switch control patterns which apply to the ringing signal sending apparatus of FIG. 2;

FIG. 8(B) shows a second set of switch control patterns which apply to the modified ringing signal sending apparatus shown in FIG. 7;

DESCRIPTION OF THE PREFERRED EMBODIMENTS

Preferred embodiments of the present invention will be described below with reference to the accompanying drawings.

Figure 1:
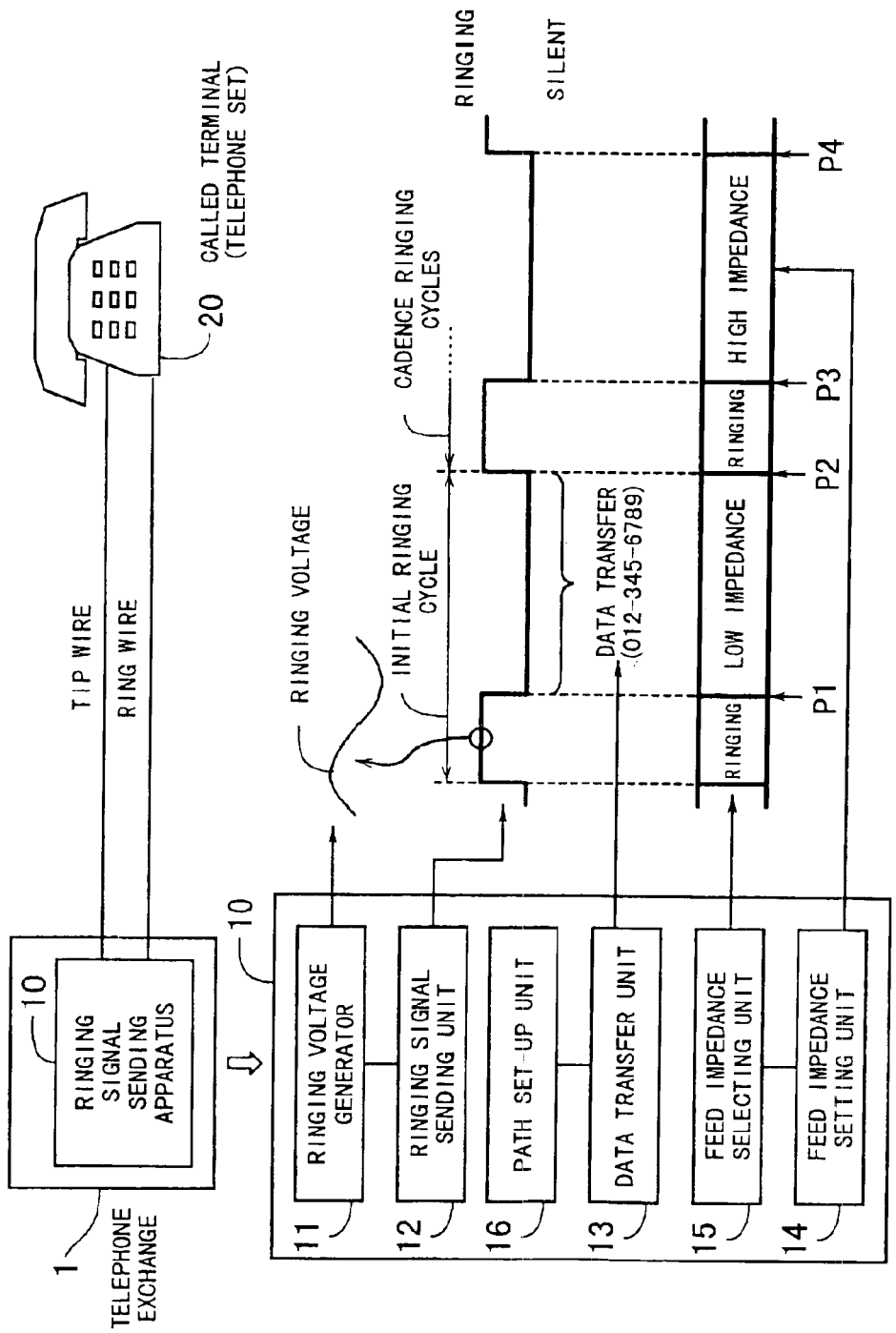
FIG. 1 is a conceptual view of a ringing signal sending apparatus according to the present invention.

FIG. 1 is a conceptual view of a ringing signal sending apparatus according to the present invention. This ringing signal sending apparatus 10 is employed in a telephone exchange 1 to provide a ringing signal to notify a called terminal (telephone set 20) of the presence of an incoming call addressed to it. This signal is sent over a subscriber line comprising a tip and ring wires to activate the ringer circuit in the called terminal. Thus the ringing signal sending apparatus 10 may be called the "ring generator" or "ringing generator."

More specifically, the ringing signal sending apparatus 10 comprises the following elements: a ringing voltage generator 11, a ringing signal sending unit 12, a data transfer unit 13, a feed impedance setting unit 14, a feed impedance selecting unit 15, and a path set-up unit 16. The ringing voltage generator 11 produces a ringing voltage, which is actually an AC voltage with a frequency of 20 to 25 Hz superimposed on a prescribed DC bias voltage (e.g., −48 V). The ringing signal sending unit 12 sends a ringing signal to the telephone set 20 over the subscriber line. This ringing signal consists of ringing periods and silent periods which will appear alternately with a prescribed duty cycle. The subscriber line is driven with the above-mentioned AC ringing voltage during each ringing period, while no AC signal is provided during the silent periods.

The path set-up unit 16 establishes a path to the telephone set 20 only when a data transfer is required. The data transfer unit 13 sends data to the telephone set 20 through the established path, using one of the silent periods. FIG. 1 illustrates a situation where a data transfer path is established solely in the silent period of the initial ringing cycle to send a caller phone number "012-345-6789" as a CLIP service function. In the case no such service functions are required, the data transfer unit 13 and path set-up unit 16 can be eliminated.

The feed impedance setting unit 14 provides a high-impedance feed voltage to drive the subscriber line. The term "high-impedance feed" refers to one type of power feeding and used in contrast to the term "low-impedance feed." The specifics of this unit 14 will be described in a later section. The feed impedance selecting unit 15 chooses a low-impedance feed voltage to drive the subscriber line during a specific silent period where a data transfer is to be performed. It chooses, in turn, a high-impedance feed voltage in other silent periods during which no data transfer is scheduled. In the example of FIG. 1, a low-impedance feed voltage is supplied in the silent period of the initial ringing cycle, while a high-impedance feed voltage is used in those in the cadence ringing cycles. This is because the ringing signal sending apparatus 10 uses the first silent period to transport data.

As described above, the ringing signal sending apparatus 10 of the present invention is designed to choose low-impedance power feeding in an attempt to send data during a silent period, while selecting high-impedance power feeding during other silent periods when no data transfer takes place. This configuration effectively suppresses most impulse noises for the following reason. As seen from FIG.

1, the ringing signal consists of ringing periods and silent periods, and in general, impulse noises are likely to occur at their transitional points. In the proposed system, however, this does not apply to the transitional points in the cadence ringing cycles (e.g., P3, P4), because the subscriber line is driven with a high-impedance feed voltage during those silent periods. While impulse noises may occur at the first two transitional points P1 and P2 in the initial ringing cycle, the proposed configuration effectively suppress the development of impulse noises for the most part of the ringing sequence.

Another point of the present invention is that the proposed ringing signal sending apparatus sets up a data transfer path only when it is required. This feature minimizes the number of silent periods that will be brought into a low impedance state, thus reducing the impulse noises on the ringing signal.

Figure 2:
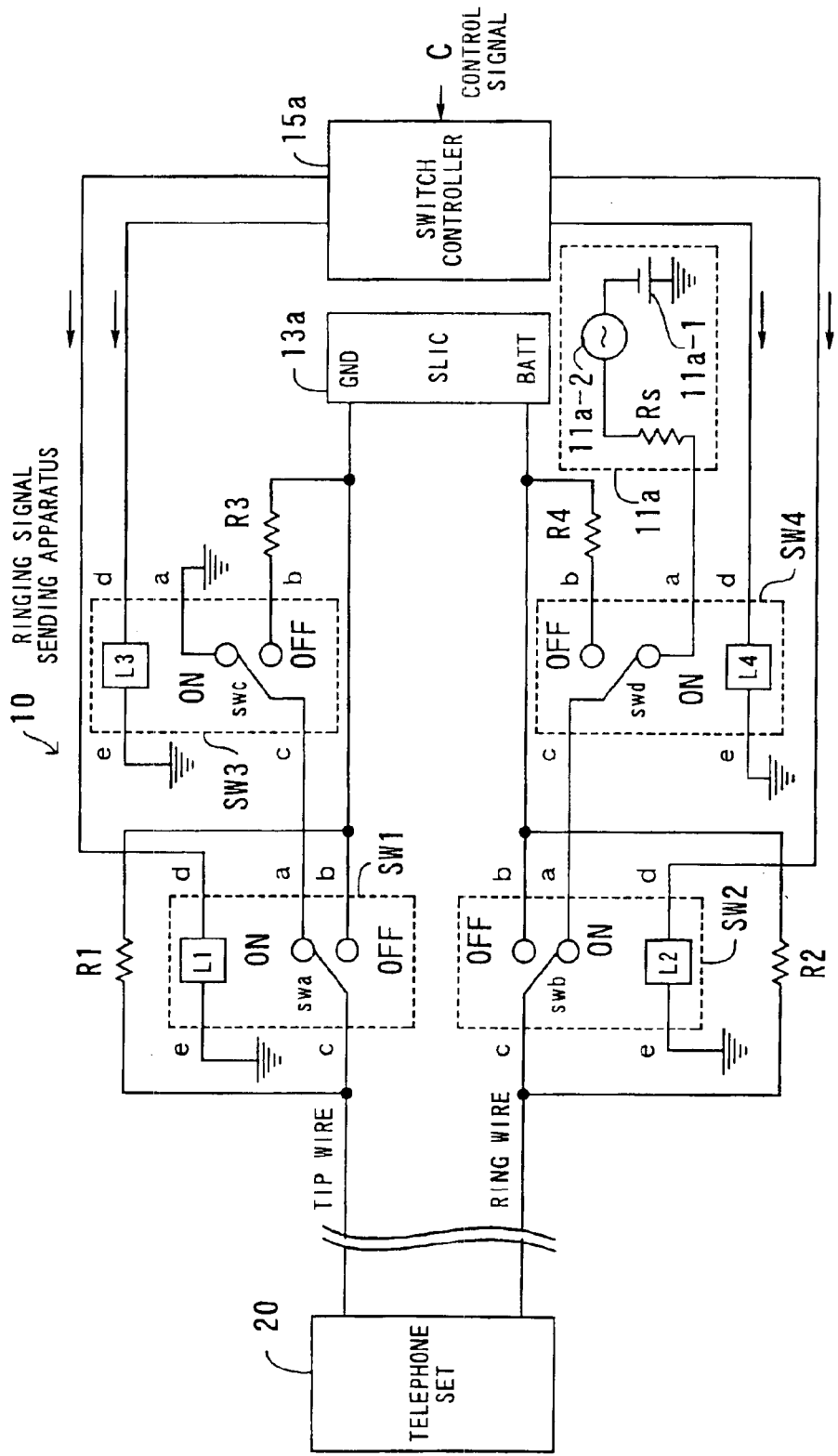
FIG. 2 is a schematic diagram of the proposed ringing signal sending apparatus.

Referring now to the schematic diagram of FIG. 2, the next section will describe a specific configuration of the proposed ringing signal sending apparatus 10.

The illustrated ringing signal sending apparatus 10 comprises a ringing voltage generator 11a, a subscriber line circuit (SLIC) 13a, a switch controller 15a, relay switches SW1 to SW4, and other discrete components. The switch controller 15a receives a control signal C from the telephone exchange 1, which specifies how long each ringing period and silent period should be. According to this control signal C, the switch controller 15a turns or and off the relay switches SW1 to SW4. While those of ordinary skill in the art will understand that some equivalent components can be realized with semiconductor technologies, the relay switches SW1 to SW4 are electromechanical relays. These relay switches SW1 to SW4 contain coils L1 to L4, respectively, which receive a driving current from the switch controller 15a through their "d" terminals. With this configuration, they serve as what have been described as the ringing signal sending unit 12 and feed impedance selecting unit 15 in FIG. 1. Also, the ringing voltage generator 11a in FIG. 2 corresponds to the ringing voltage generator 11 in FIG. 1, and the SLIC 13a in FIG. 2 serves as the data transfer unit 13 in FIG. 1. The function of the feed impedance setting unit 14 in FIG. 1 is provided in FIG. 2 by two resistors R3 and R4.

The SLIC 13a supplies the telephone set 20 with a voltage of −48 VDC via the subscriber line, when it is in the off-hook state. When sending to it a ringer signal, the SLIC 13a performs a data transfer over the subscribe line, using a prescribed time slot such as the silent period in the initial ringing cycle.

The following section will describe how the components are interconnected in the proposed ringing signal sending apparatus 10. The telephone set 20 is connected to one end of the resistor R1, as well as to the terminal "c" of the relay switch SW1, through the tip wire. The other end of the resistor R1 is connected to the terminal "b" of the relay switch SW1, one end of the resistor R3, and the ground terminal (GND) of the SLIC 13a. Regarding the relay switch SW1, its terminal "a" is connected to the terminal "c" of the relay switch SW3; its terminal "e" is grounded; and its terminal "d" is connected to the switch controller 15a. Regarding the relay switch SW3, its terminals "a" and "e" are grounded; its terminal "b" is connected to the other end of the resistor R3; and its terminal "d" is connected to the switch controller 15a. The telephone set 20 is also connected to one end of the resistor R2, as well as to the terminal "c" of the relay switch SW2, through the ring wire. The other end of the resistor R2 is connected to the terminal "b" of the relay switch SW2, one end of the resistor R4, and the terminal BATT (−48V feed power source) of the SLIC 13a. Regarding the relay switch SW2, its terminal "a" is connected to the terminal "c" of the relay switch SW4: its terminal "e" is grounded; and its terminal "d" is connected to the switch controller 15a. Regarding the relay switch SW4, its terminal "b" is connected to the other end of resistor R4; its terminal "d" is connected to the switch controller 15a; and its terminal "e" is connected to the GND.

The ringing voltage generator 11a comprises a ringing signal bias voltage source 11a-1 (e.g., −48V), a ringing voltage source 11a-2 (i.e., the source of AC ringing voltage), and a resistor Rs (i.e., the source impedance of the ringing voltage source). One end of this resistor Rs is connected to the terminal "a" of the relay switch SW4, while the other end is connected to the ringing voltage source 11a-2. The ringing signal bias voltage source 11a-1 is connected in series with the ringing voltage source 11a-2.

The notation about the state of each relay switch SW1 to SW4 is as follows. The relay switch SW1 is said to be "ON" when the circuit between its terminals "swa" and "a" is closed, and "OFF" when that between "swa" and "b" is closed. Likewise, the relay switch SW2 is said to be "ON" when the circuit between its terminals "swb" and "a" is closed, and "OFF" when that between "swb" and "b" is closed. The relay switch SW3 is said to be "ON" when the circuit between its terminals "swc" and "a" is closed, and "OFF" when that between "swc" and "b" is closed. The relay switch SW4 is said to be "ON" when the circuit between its terminals "swd" and "a" is closed, and "OFF" when that between "swd" and "b" is closed.

Referring next to the timing diagram of FIG. 3, the operation of the circuit of FIG. 2 will now be described below. In the present example, the ringing signal is defined as a repeated sequence of a ringing period and a silent period. The duration of ringing is 1.2 seconds throughout the sequence, while that of the silence is 2.8 seconds in the initial ringing cycle, and 3.0 seconds in the cadence ringing cycles. Data transfer is confined within the silent period of the initial ringing cycle.

The above-described duty cycle of the ringing signal is specified by a control signal C. More specifically, the control signal C directs the switch controller 15a (and other related function blocks) to send out the ringing voltage during each ringing period, and to provide a −48 V feed voltage to the telephone set 20 during each silent period. In FIG. 3, these two states of the signal are distinguished by the labels "Ringing" and "Feeding." According to this control signal C, the proposed apparatus drives the subscriber line, changing its driving impedance depending on the usage of each silent period. During the silent period of the initial ringing, the subscriber line is driven with a low-impedance feed voltage to perform a data transfer. During the other silent periods (i.e., those in the cadence ringing cycles, during which no data transfer takes place), the subscriber line is driven with a high-impedance feed voltage.

To accomplish the above state switching operation, the relay switches SW1 to SW4 will be controlled as follows. During the ringing period of the initial ringing cycle, SW1 to SW4 are all set to the "ON" state. During the silent period of the initial ringing cycle, SW1 and SW2 are turned to "OFF," while SW3 and SW4 can be in either state (i.e., "Don't care"). During the cadence ringing cycles, the relay switches SW1 and SW2 are kept in the "ON" state, while the other relay switches SW3 and SW4 are set to "ON" in each ringing period and to "OFF" in each silent period. As seen from FIG. 2, the resistors R3 and R4 will be inserted in series between the telephone set 20 and SLIC 13a during the silent period of each cadence ringing cycle. This insertion of R3 and R4 raises the source impedance of power feeding to the subscriber line, which is what has been referred to as the "high-impedance feed." When R3 and R4 are not inserted, it is called the "low-impedance feed," and the feed voltage at that time is referred to as the "low-impedance feed voltage."

Figure 3:
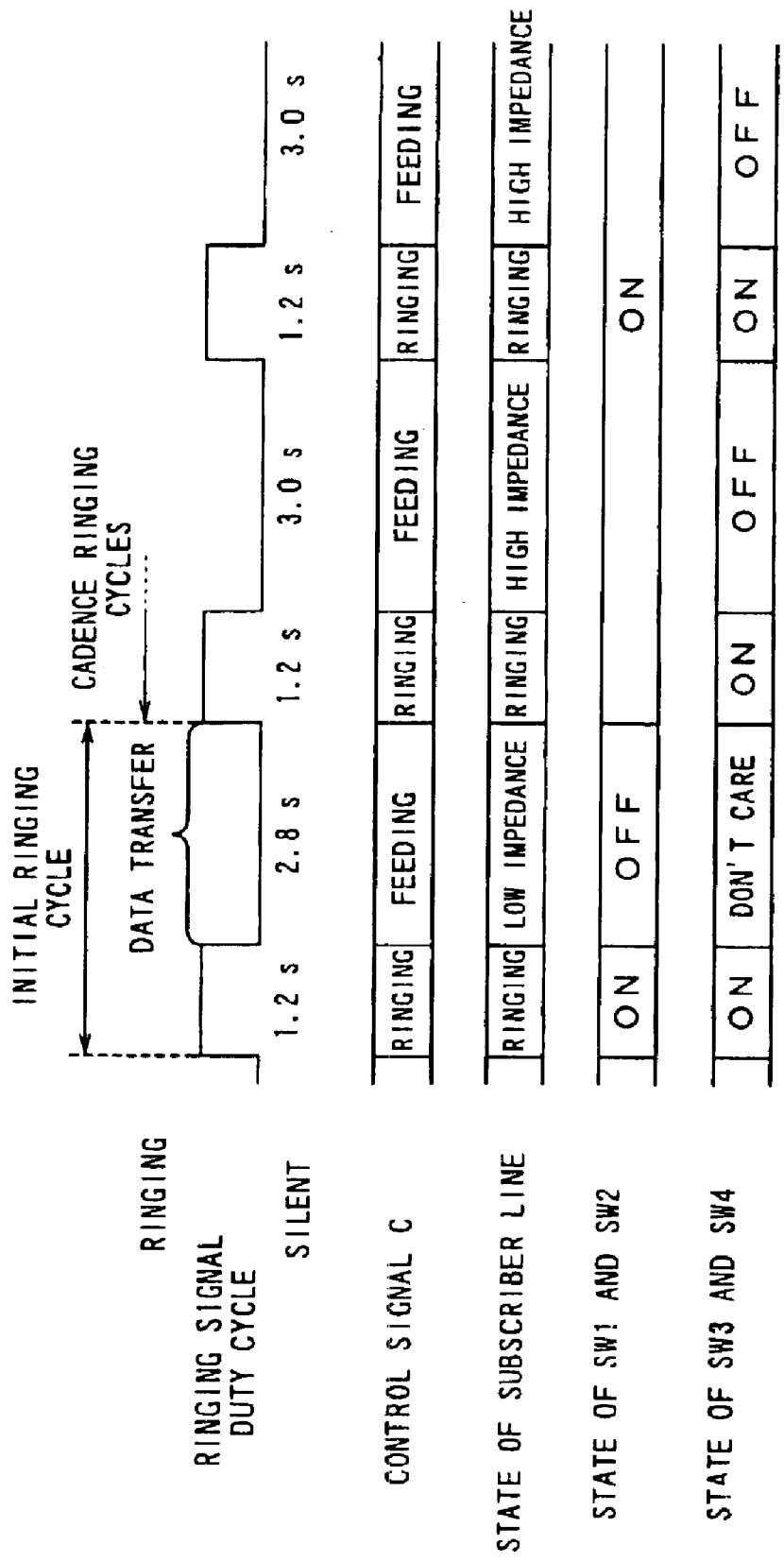
FIG. 3 is a timing diagram which explains the operation of the proposed ringing signal sending apparatus.
Figure 4:
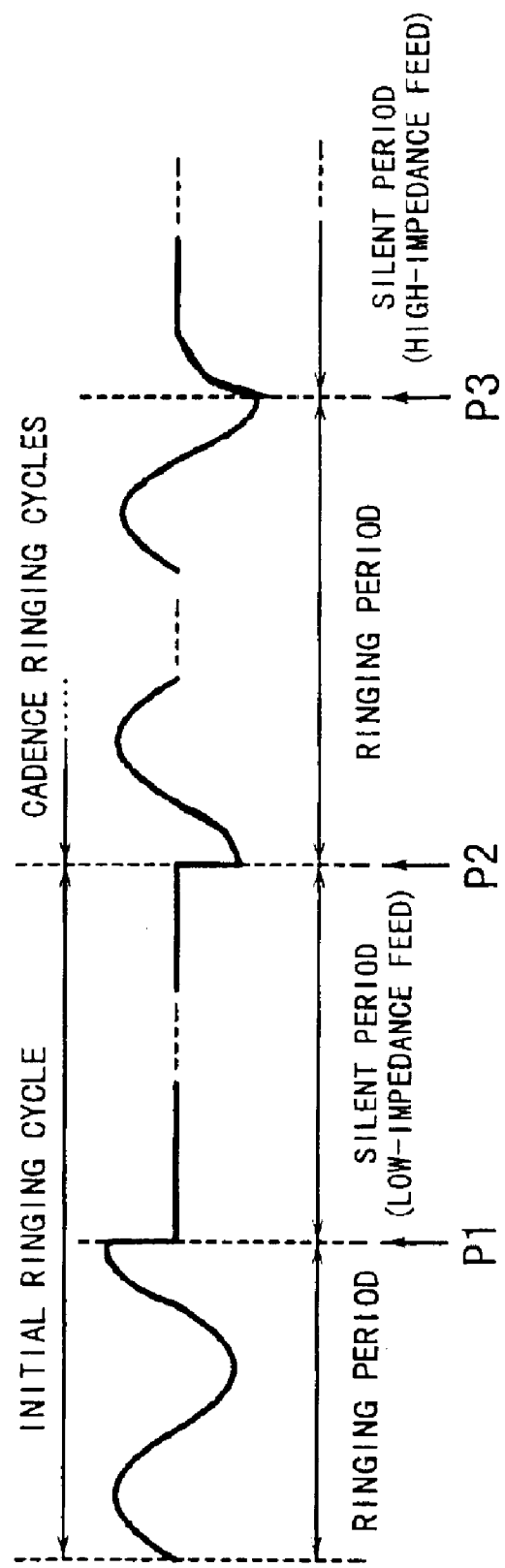
FIG. 4 is a diagram which shows the waveform of a ringing signal that is produced by the proposed apparatus.

FIG. 4 shows the waveform of the resultant ringing signal that is produced by the circuit of FIG. 2, based on the timing chart of FIG. 3. As seen from FIG. 4, the waveform exhibits steep, discontinuous transitions at the beginning point (P1) and end point (P2) of the silent period in the initial ringing cycle. This is because the subscriber line is driven with a normal, low-impedance feed voltage. Accordingly, some impulse noises could be developed at these two points. In contrast, the waveform exhibits continuous transitions (as seen at the point P3) in later silent periods because the high-impedance feed voltage is applied.

According to the present invention, the proposed ringing signal sending apparatus is designed to supply the subscriber line with a feed voltage with a higher source impedance on during silent periods when there is no data to be transferred. This configuration suppresses the production of impulse noises, which is likely to occur between a ringing period and a silent period.

Further, according to the present invention, the proposed ringing signal sending apparatus appropriately controls the relay switches SW1 to SW4 to connect the SLIC 13a to the telephone set 20 only when a data transfer is scheduled. That is, a data transfer path is established only when it is needed. Recall that establishing a data transfer path means reducing the feed impedance, and this encourages the production of impulse noises. The proposed apparatus, however, limits the path establishment, thus reducing the chances of production of noises.

Figure 5:
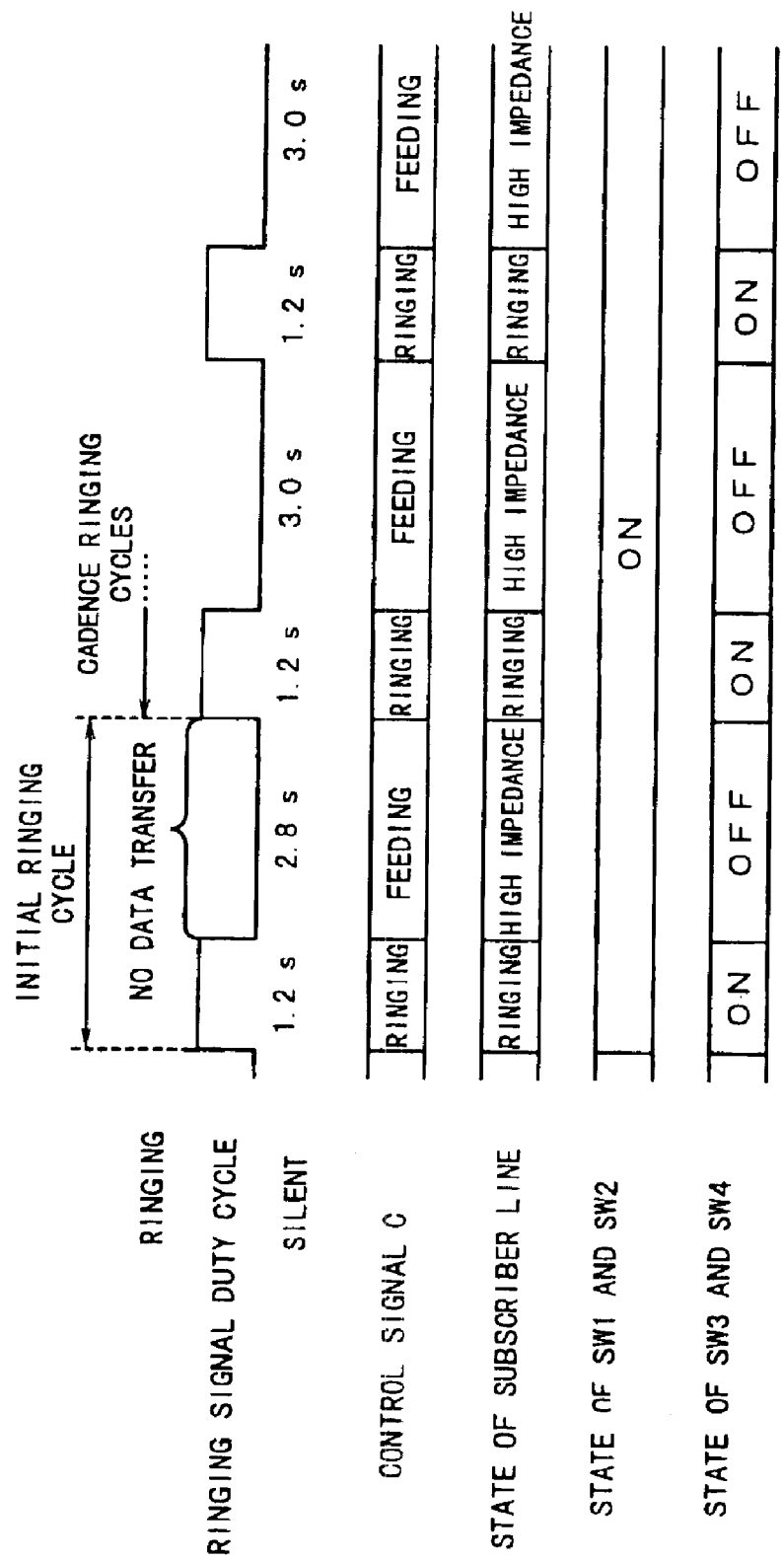
FIG. 5 is a timing diagram which shows a ringing signal generation process where no data transfer is performed.

FIG. 5 is a timing diagram which shows the ringing signal generation process where no data transfer is performed. The illustrated ringing sequence differs from what was described in FIG. 3 in that the silent period in the initial ringing cycle is not used for transferring data. In other words, the SLIC 13a never sends data to the telephone set 20. Accordingly, the subscriber line carries a ringing voltage during each ringing period and a high-impedance feed voltage during each silent period, regardless of whether it is of the initial ringing cycle or cadence ringing cycle.

To accomplish the above state switching operation, SW1 and SW2 are kept in the "ON" state throughout the ringing sequence. The other two relay switches SW3 and SW4 are consistently driven to the "ON" state during ringing periods, and turned to the "OFF" state during silent periods.

Figure 6:
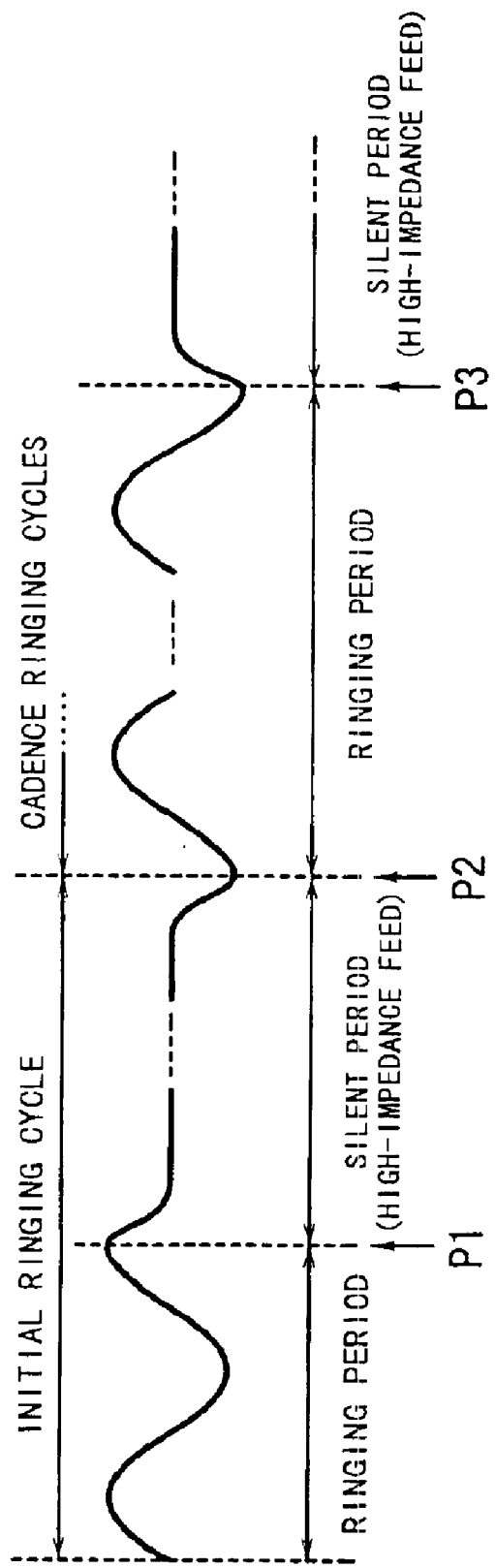
FIG. 6 is a diagram which shows the waveform of a ringing signal that is produced in the process of FIG. 5.

FIG. 6 shows the waveform of the resultant ringing signal that is produced according to the timing chart of FIG. 3. As seen from this FIG. 6, the ringing signal exhibits a continuous waveform throughout the initial and cadence ringing cycles. The subscriber line is consistently driven with a high-impedance feed voltage in the silent periods, which allows the signal waveform to vary smoothly even at the transition points (e.g., P1, P2, P3) between different line states. For this reason, impulse noises are unlikely to occur.

Figure 7:
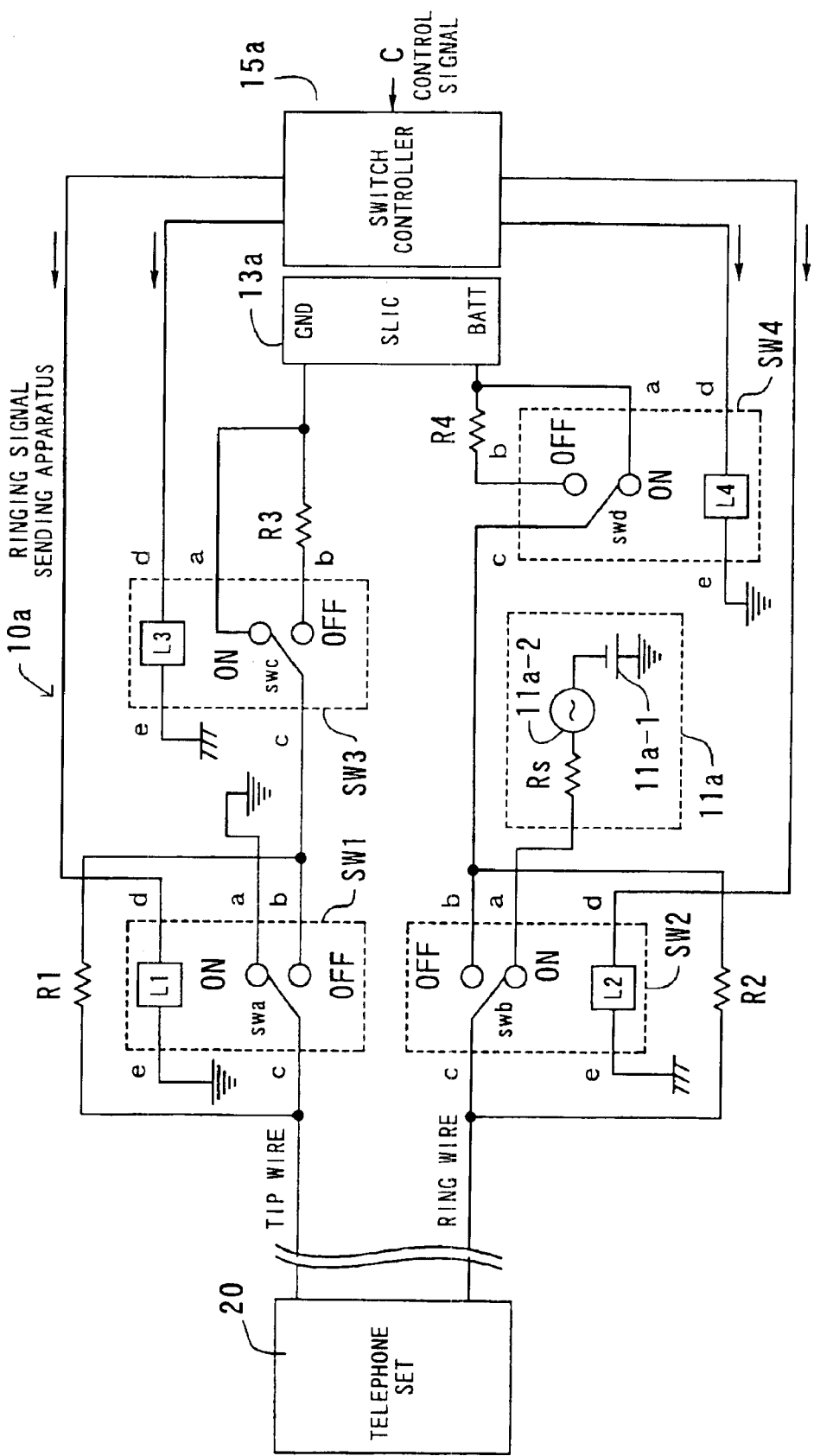
FIG. 7 is a diagram which shows a variation of the proposed circuit configuration.

Referring next to FIG. 7, a variation of the circuit configuration of FIG. 2 will be described below. This modified ringing signal sending apparatus 10a is different from the original ringing signal sending apparatus 10 (FIG. 2) solely in the electrical connection of its components. That is, the telephone set 20 is connected to one end of the resistor R1, as well as to the terminal "c" of the relay switch SW1, through the tip wire of the subscriber line. The other end of the resistor R1 is connected to the terminal "b" of the relay switch SW1 and the terminal "c" of the relay switch SW3. The terminals "a" and "e" of the relay switch SW1 are grounded, while the terminal "d" is connected to the switch controller 15a. Regarding the relay switch SW3, its terminal "a" is connected to one end of the resistor R3 and the ground terminal (GND) of the SLIC 13a; its terminal "b" is connected to the other end of the resistor R3; its terminal "d" is connected to the switch controller 15a; and its terminal "e" is grounded.

The telephone set 20 is also connected to one end of the resistor R2, as well as to the terminal "c" of the relay switch SW2, through the ring wire. The other end of the resistor R2 is connected to the terminal "b" of the relay switch SW2, as well as to the terminal "c" of the relay switch SW4. The terminal "a" of the relay switch SW2 is connected to one end of the resistor Rs. The other end of the resistor Rs is connected to the ringing voltage source 11a-2. The ringing signal bias voltage source 11a-1 and the ringing voltage source 11a-2 are connected in series. Regarding the relay switch SW2, its terminal "d" is connected to the switch controller 15a, while its terminal "e" is grounded. The terminal "b" of the relay switch SW4 is connected to an end of resistor R4. The other end of resistor R4 is connected to the terminal "a" of the relay switch SW4, as well as to the terminal "BATT" of the SLIC 13a. Regarding the relay switch SW4, its terminal "d" is connected to the switch controller 15a, while its terminal "e" is grounded.

FIGS. 8(A) and 8(B) show the difference between two switch control methods. More specifically, FIG. 8(A) shows a first set of switch control patterns which apply to the ringing signal sending apparatus 10 of FIG. 2. FIG. 8(B) shows a second set of switch control patterns which apply to the modified ringing signal sending apparatus 10a shown in FIG. 7.

The table of FIG. 8(A) summarizes the first set of switch control patterns. That is, to place an AC ringing voltage on the subscriber line, the relay switches SW1 to SW4 will all be rendered to "ON." To provide a low-impedance feed voltage to the subscriber line, the relay switches SW1 and SW2 should be turned to "OFF," no matter in which state the other relay switches SW3 and SW4 may be. To provide, in turn, a high-impedance feed voltage to the subscriber line, the relay switches SW1 and SW2 should be "ON," and the other relay switches SW3 and SW4 should be "OFF."

The table of FIG. 8(B) summarizes the second set of switch control patterns. That is, to place an AC ringing signal on the subscriber line, the relay switches SW1 and SW2 should be turned to "ON," no matter in which state the other relay switches SW3 and SW4 may be. To provide a low-impedance feed voltage to the subscriber line, the relay switches SW1 and SW2 should be turned to "OFF," and the other relay switches SW3 and SW4 should be turned to "ON." To provide, in turn, a high-impedance feed voltage to the subscriber line, all the relay switches SW1 to SW4 should be turned to "OFF."

As seen from the above explanation, the two ringing signal sending apparatus 10 (FIG. 2) and 10a (FIG. 7) share the same basic concept, although they use different switch control patterns. For this reason, the following explanation about the function of the feed impedance setting unit 14 will assume the circuit configuration of FIG. 2.

The role of the feed impedance setting unit 14 is to provide a high-impedance feed voltage for driving the subscriber line. In the embodiment explained in FIG. 2, this function is realized by controlling the relay switches SW1 to SW4 in such a way that two resistors R3 and R4 will be inserted in series with the GND and BATT circuits of the SLIC, respectively.

Figure 9:
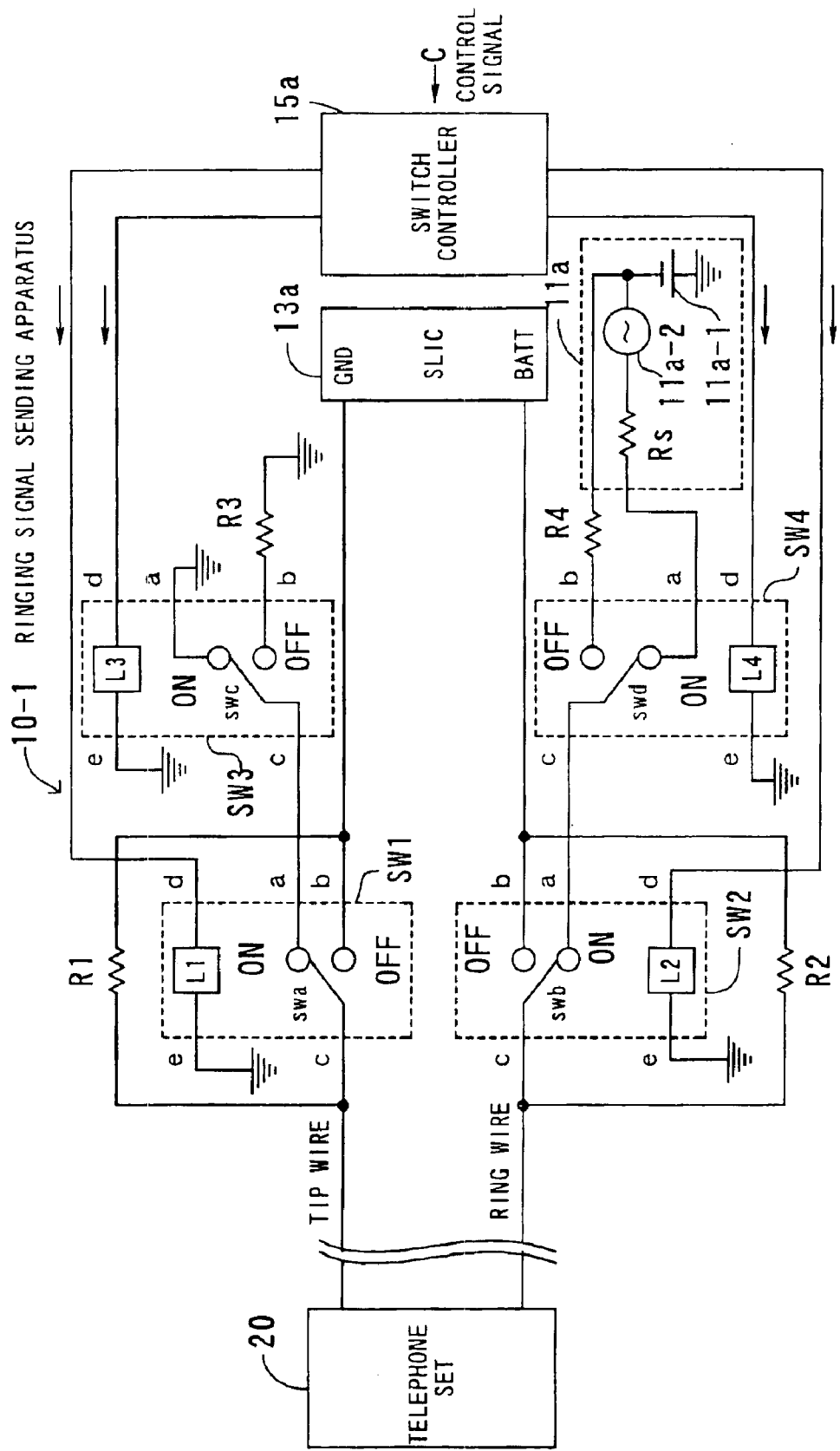
FIG. 9 is a schematic diagram of another ringing signal sending apparatus which has a resistor being connected to its ringing signal bias voltage source.

There is an alternative implementation of the feed impedance setting unit 14 to yield the same result. FIG. 9 is a schematic diagram of this alternative ringing signal sending apparatus 10-1, which comprises a resistor that is connected to its ringing signal bias voltage source 11a-1. More specifically, one end of the resistor R3 is connected to the terminal "b" of the relay switch SW3, while the other end is connected to the ground. Further, one end of the resistor R4 is connected to the terminal "b" of the relay switch SW4, while the other end is connected to the ringing signal bias voltage source 11a-1 in ringing voltage generator 11a. Other circuit connections are similar to what have already been described in FIG. 2.

Figure 10:
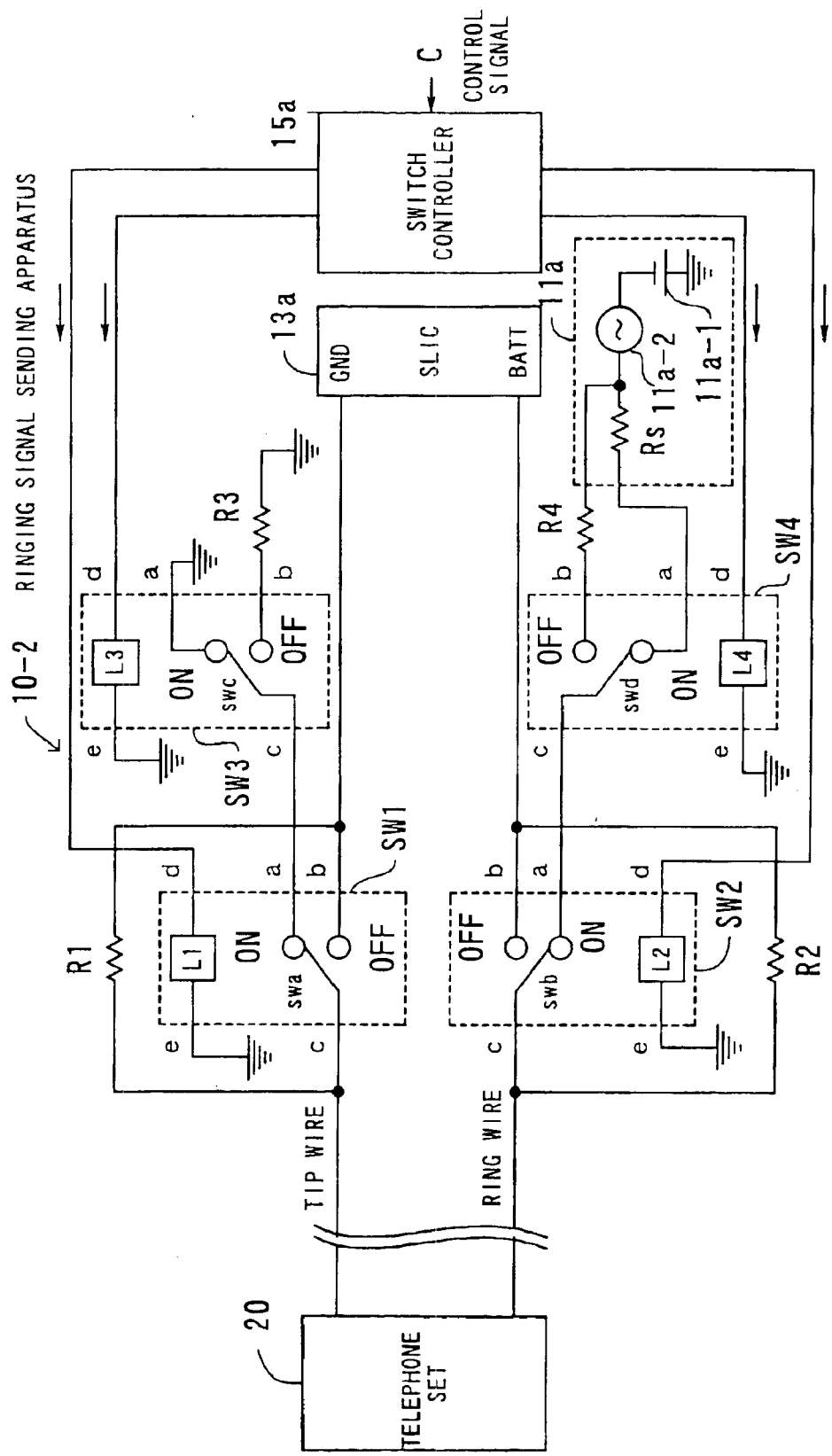
FIG. 10 is a schematic diagram of still another ringing signal sending apparatus which has a resistor being connected to its ringing voltage source.

Another possible implementation is to insert a resistor at the output to the ringing voltage source 11a-2 in the ringing voltage generator 11a as shown in the schematic diagram of FIG. 10. In this modified ringing signal sending apparatus 10-2, one end of the resistor R3 is connected to the terminal "b" of the relay switch SW3, while the other end is connected to the ground. One end of the resistor R4 is connected to the terminal "b" of the relay switch SW4, while the other end is connected at the junction point between the resistor Rs and ringing voltage source 11a-2 in the ringing voltage generator 11a. Other circuit configuration is similar to what has already been described in FIG. 2.

Figure 11:
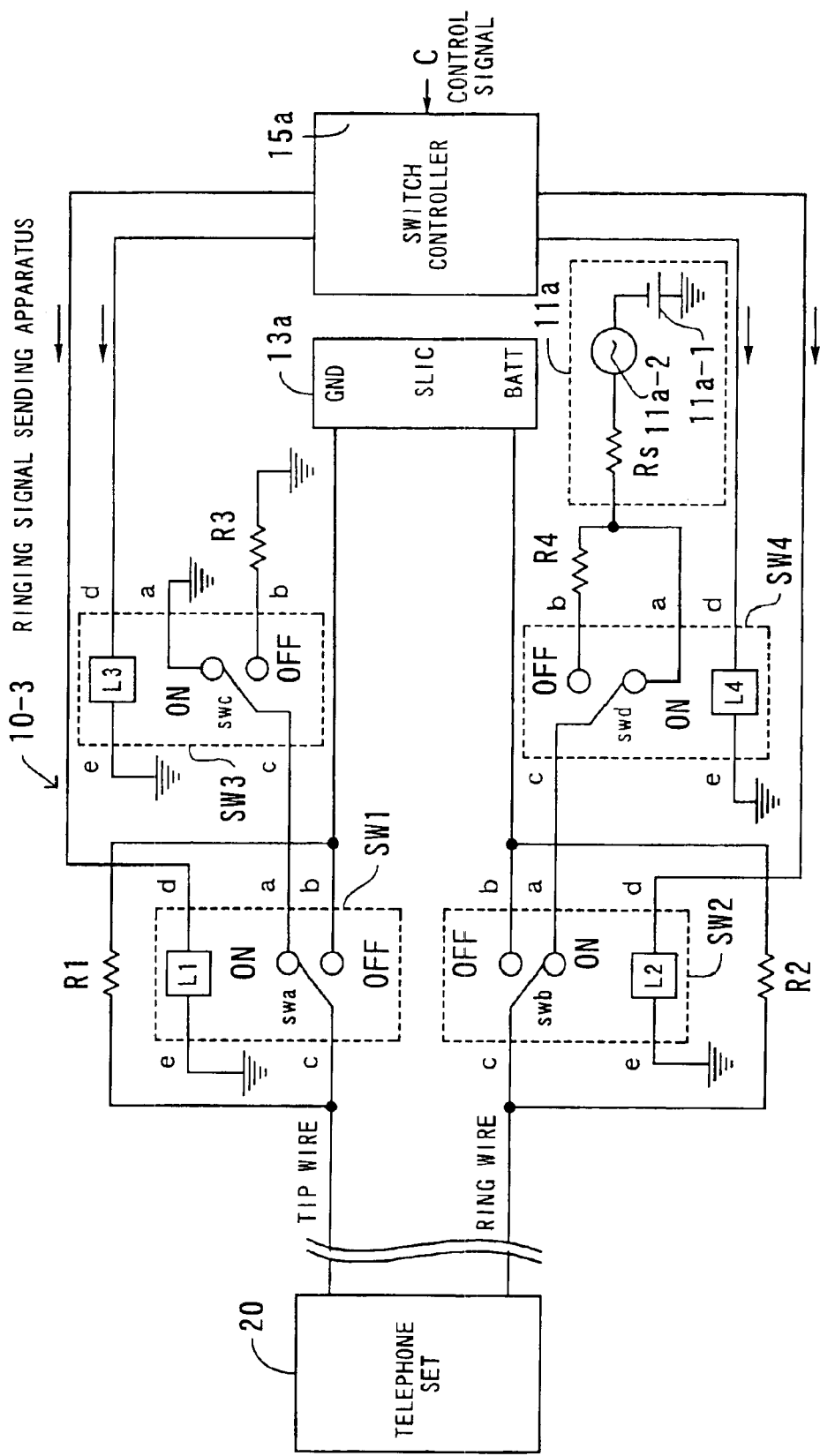
FIG. 11 is a schematic diagram of a yet another ringing signal sending apparatus which has a resistor being located at the output of its ringing voltage generator.

Still another possible implementation is to insert a resistor at the output of the ringing voltage generator 11a to yield a higher impedance, as shown in FIG. 11. In this modified ringing signal sending apparatus 10-3, one end of the resistor R3 is connected to the terminal "b" of relay switch SW3, while the other end is connected to the ground. One end of the resistor R4 is connected to the terminal "b" of the relay switch SW4, while the other end is connected to the terminal "a" of the relay switch SW4, as well as to the output terminal of the ringing voltage generator 11a (or one end of the resistor Rs). Other circuit configuration is similar to what has already been described in FIG. 2.

The proposed ringing signal sending apparatus 10 and their variants can support a variety of ringing patterns. The following sections will present several example patterns and describe how they are processed.

Figure 12:
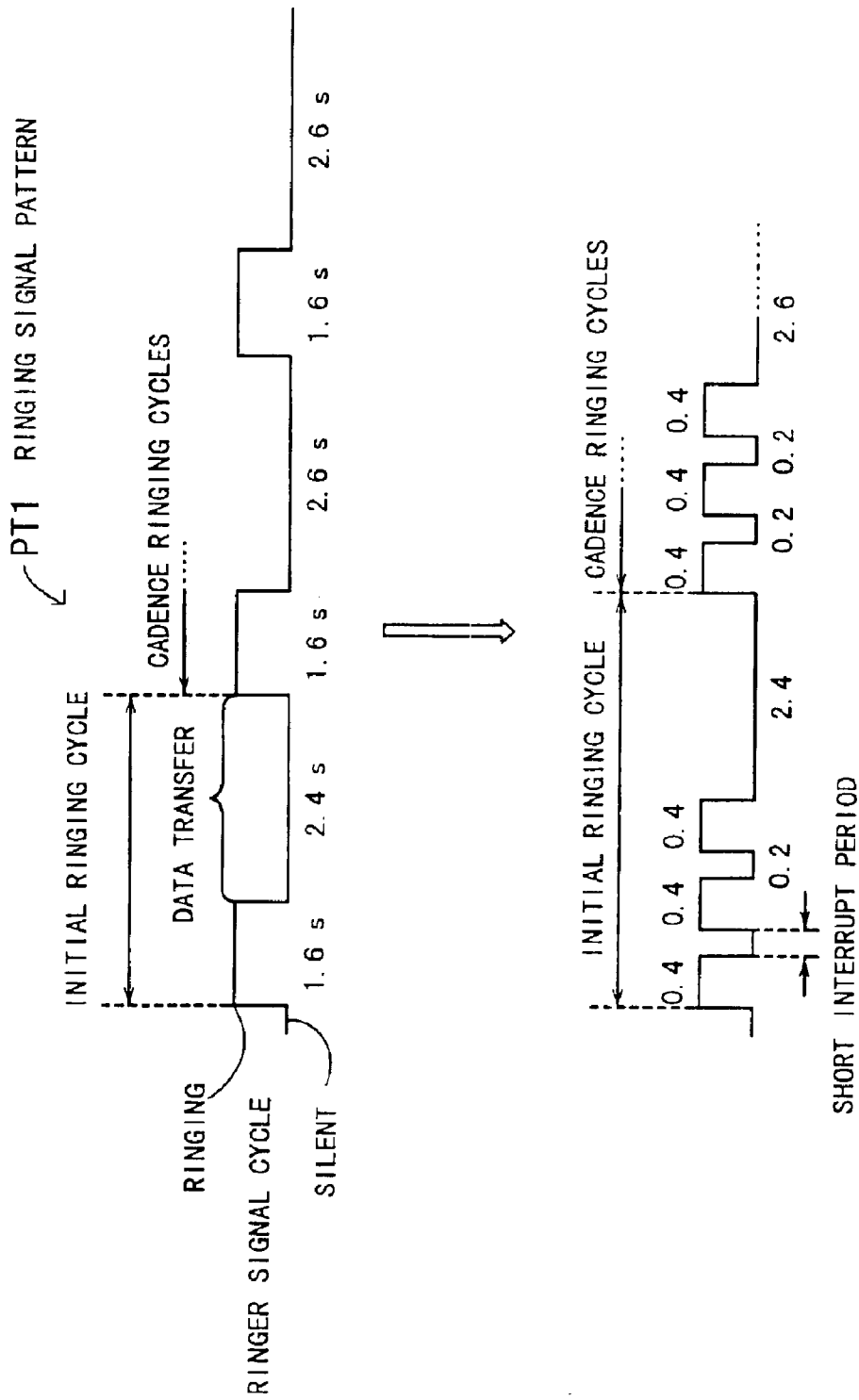
FIG. 12 is a diagram which shows a ringing signal pattern PT1.

FIG. 12 shows a ringing signal pattern. This pattern PT1 is composed of fixed-length ringing periods and variable-length silent periods which appear alternately. While each ringing period is fixed to 1.6 seconds throughout the entire sequence of initial and cadence ringing cycles, the silent period is 2.4 seconds in the initial ringing cycle and 2.6 seconds in the cadence ringing cycles. Microscopically, an intermittent ringing signal is generated in every ringing period, with a duty cycle of 0.4 seconds ON and 0.2 seconds OFF; the former is referred to herein as the "active ringing period," and the latter the "short interrupt period." The silent period of the initial ringing cycle is used to transfer data to the called telephone set.

Figure 13:
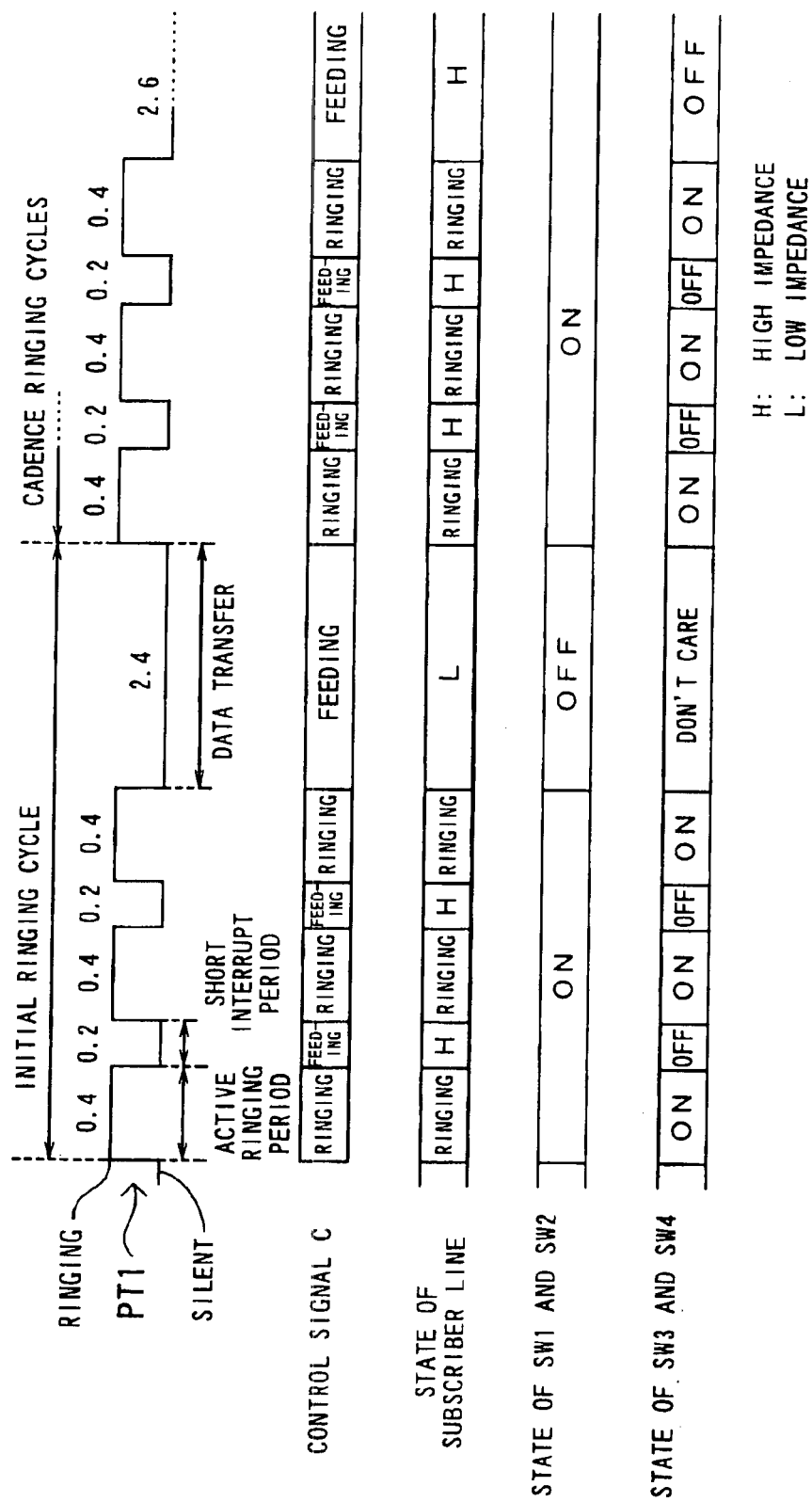
FIG. 13 is a timing diagram which shows how the proposed apparatus generates the ringing signal pattern of FIG. 12.

FIG. 13 is a timing diagram which shows how the proposed ringing signal sending apparatus 10 generates the above-described ringing signal pattern PT1. The pattern PT1 is specified by a control signal C, so that the subscriber line will carry a ringing voltage in the active ringing periods and supply a feed voltage in the short interrupt periods and silent periods throughout the entire sequence. According to this control signal C, the state of the subscriber line is switched from one to another. That is, the subscriber line will be supplied with: (1) the ringing voltage in each active ringing period throughout the entire ringing sequence; (2) the high-impedance feed voltage in every short interrupt period, as well as in each silent periods except for that in the initial ringing cycle; and (3) the low-impedance feed voltage in the silent period in the initial ringing cycle, during which a data transfer takes place.

To accomplish the above state switching operation, the relay switches SW1 to SW4 will be controlled as follows. During the active ringing period of the initial ringing cycle, SW1 to SW4 are all set to "ON." During each short interrupt period in the initial ringing cycle, SW3 and SW4 should be "OFF," while SW1 and SW2 keep their "ON" state. During the silent period in the initial ringing cycle, SW1 and SW2 are set to "OFF," while SW3 and SW4 can be in either state (i.e., "Don't care"). When the sequence enters the cadence ringing cycles, SW1 and SW2 are both turned to "ON" and kept in that state. SW3 and SW4, on the other hand, should be "ON" in each active ringing period, and "OFF" in short each interrupt period and silent period.

As previously noted, the actual signal waveform may exhibit steep, discontinuous transitions at the beginning and end points of the initial silent period because of its low-impedance power feeding, in contrast to smooth transitions in other silent periods with high-impedance power feeding. This characteristic also applies to the ringing pattern PT1 of FIG. 13. Refer to the earlier part of the description for details.

Figure 14:
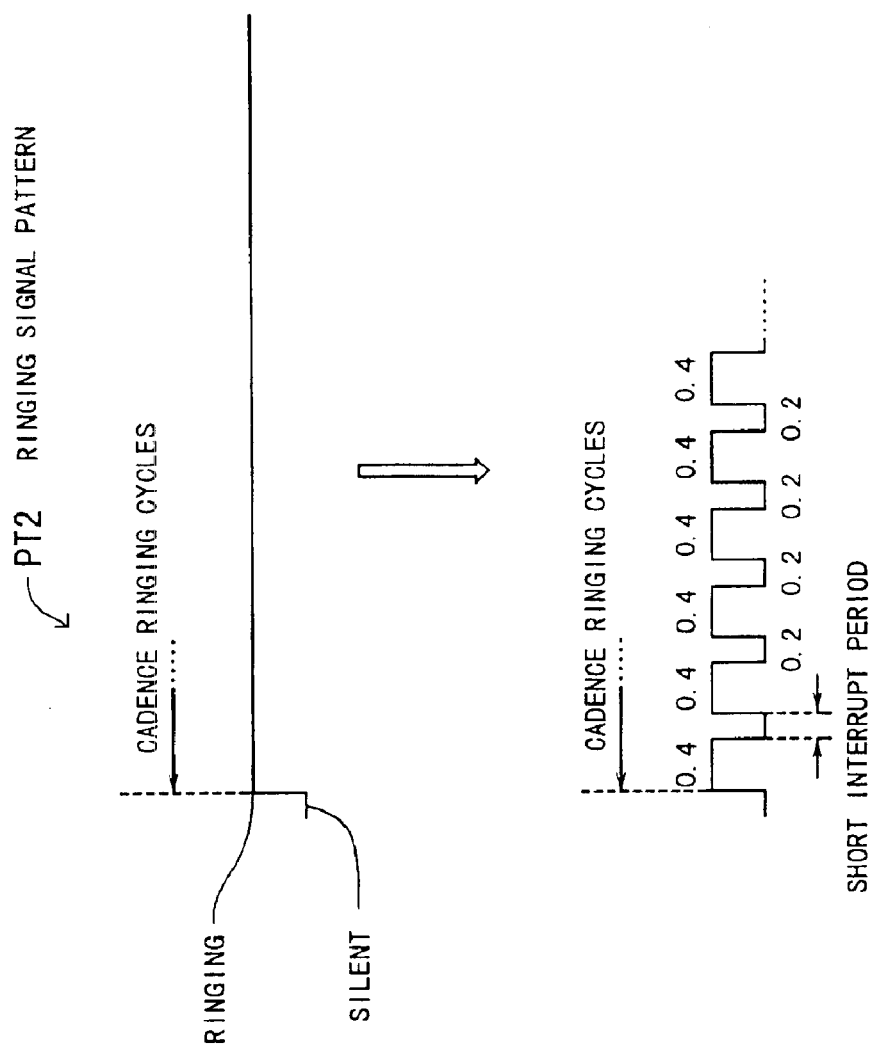
FIG. 14 shows another ringing signal pattern PT2.

FIG. 14 shows another ringing signal pattern. This pattern PT2 consists solely of cadence ringing cycles, each being composed of an active ringing period of 0.4 seconds and a short interrupt period of 0.2 seconds. No data transfer is supported.

Figure 15:
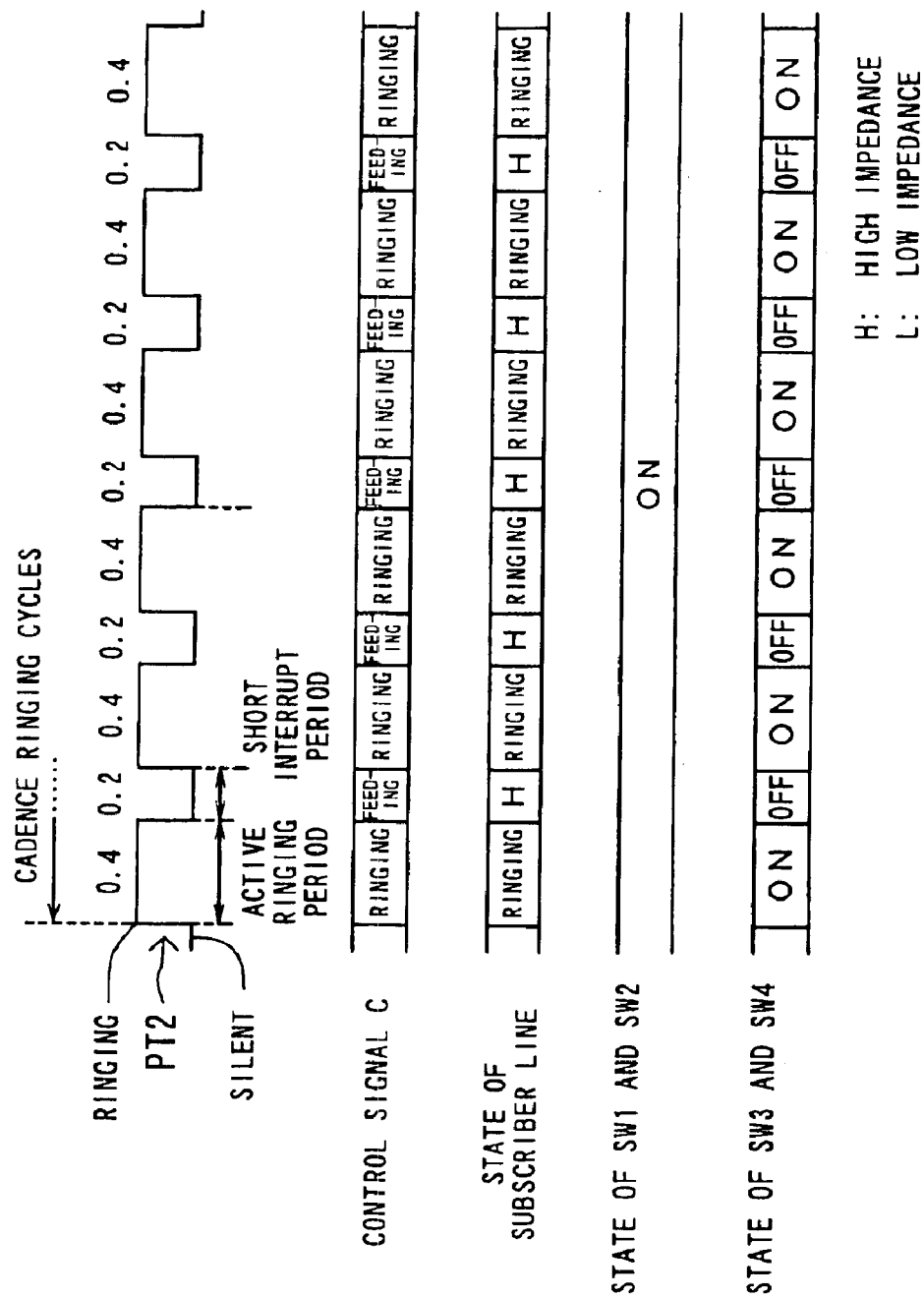
FIG. 15 is a timing diagram which shows how the proposed apparatus generates the ringing signal pattern of FIG. 14.

FIG. 15 is a timing diagram which shows how the proposed ringing signal sending apparatus 10 generates the above-described ringing signal pattern PT2. The control signal C directs that the subscriber will carry a ringing voltage in the active ringing periods and a feed voltage in the short interrupt periods. According to this control signal C, the state of the subscriber line is switched from one to another. That is, the subscriber line will be supplied with: (1) the ringing voltage in each active ringing period; and (2) the high-impedance feed voltage in every short interrupt period.

To accomplish the above state switching operation, the relay switches SW1 to SW4 will be controlled as follows. That is, throughout a ringing sequence, SW1 and SW2 maintain their "ON" state. SW3 and SW4, on the other hand, are rendered to "ON" in each active ringing period, and to "OFF" in each short interrupt period.

Figure 16:
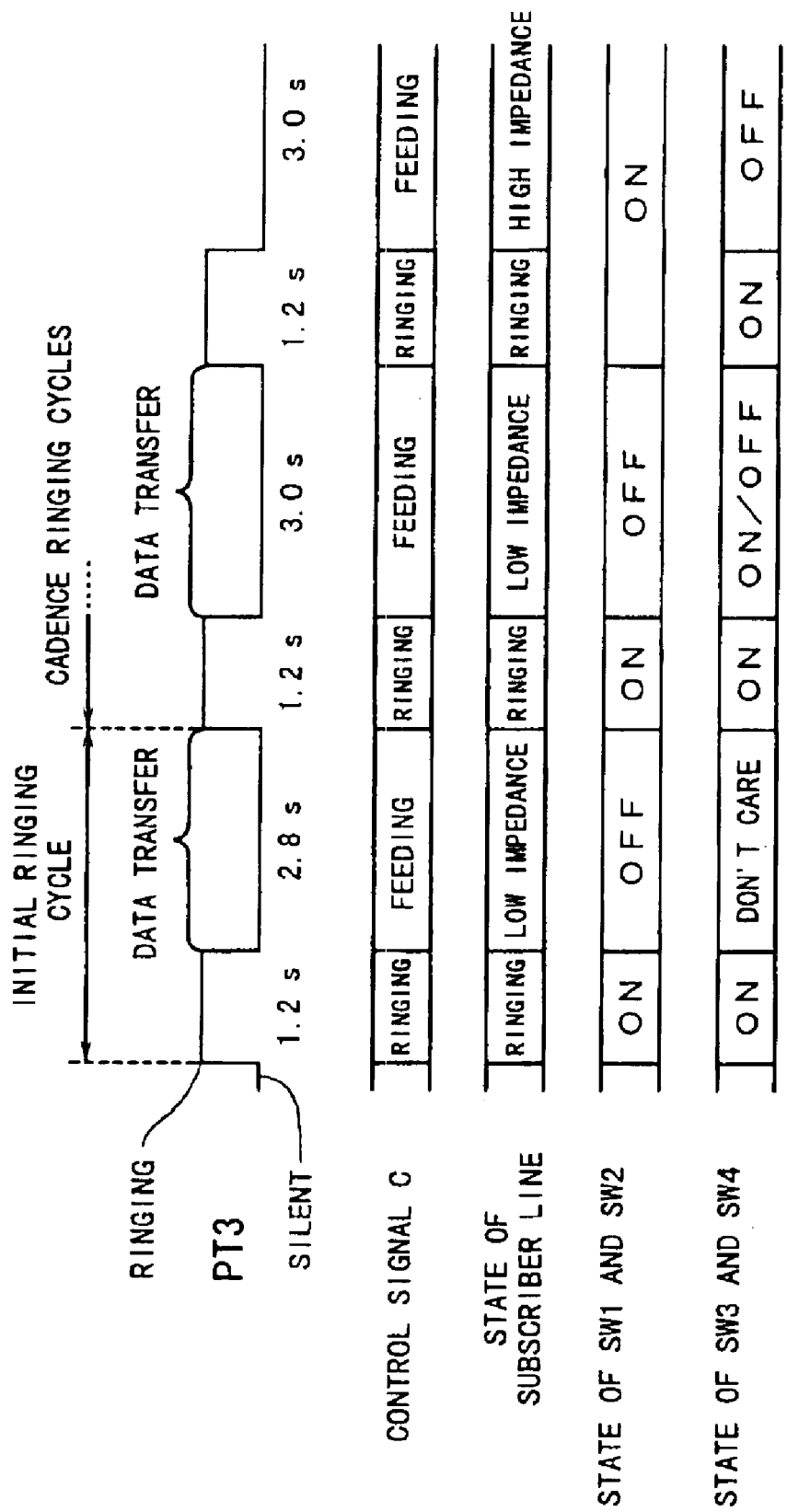
FIG. 16 is a timing diagram which shows how the proposed apparatus generates still another ringing signal pattern PT3.

Referring next to FIG. 16, still another ringing pattern will be described. This ringing pattern PT3 differs from the other ones described so far in that it uses two silent periods to transfer data. They are: the silent period in the initial ringing cycle and that in the first cadence ringing cycle. FIG. 16 is a timing diagram which shows how the proposed ringing signal sending apparatus 10 generates the ringing signal pattern PT3. As FIG. 16 shows, the control signal C specifies that the subscriber line will carry a ringing voltage in ringing periods and a feed voltage in silent periods. According to this control signal C, the proposed apparatus drives the subscriber line with a low-impedance feed voltage in the first two silent periods to perform a data transfer. During the silent period in the second and later cadence ringing cycles, it drives the subscriber line with a high-impedance feed voltage, since no data transfer takes place.

To accomplish the above state switching operation, the relay switches SW1 to SW4 will be controlled as follows. First, SW1 to SW4 are all set to "ON" and kept in that state until the ringing period of the initial ringing cycle is finished. When the subsequent silent period begins, SW1 and SW2 are turned to "OFF," while SW3 and SW4 can be either state (i.e., "Don't care"). All the relay switches SW1 to SW4 are set to "ON" during each ringing period in the cadence ringing cycles. In the silent period of the first cadence ringing cycle, SW1 and SW2 are set to "OFF," while SW3 and SW4 can be either state (i.e., "Don't care"). In each silent period of the second and later cadence ringing cycles, SW1 and SW2 should be "ON," and SW3 and SW4 should be "OFF."

Figure 17:
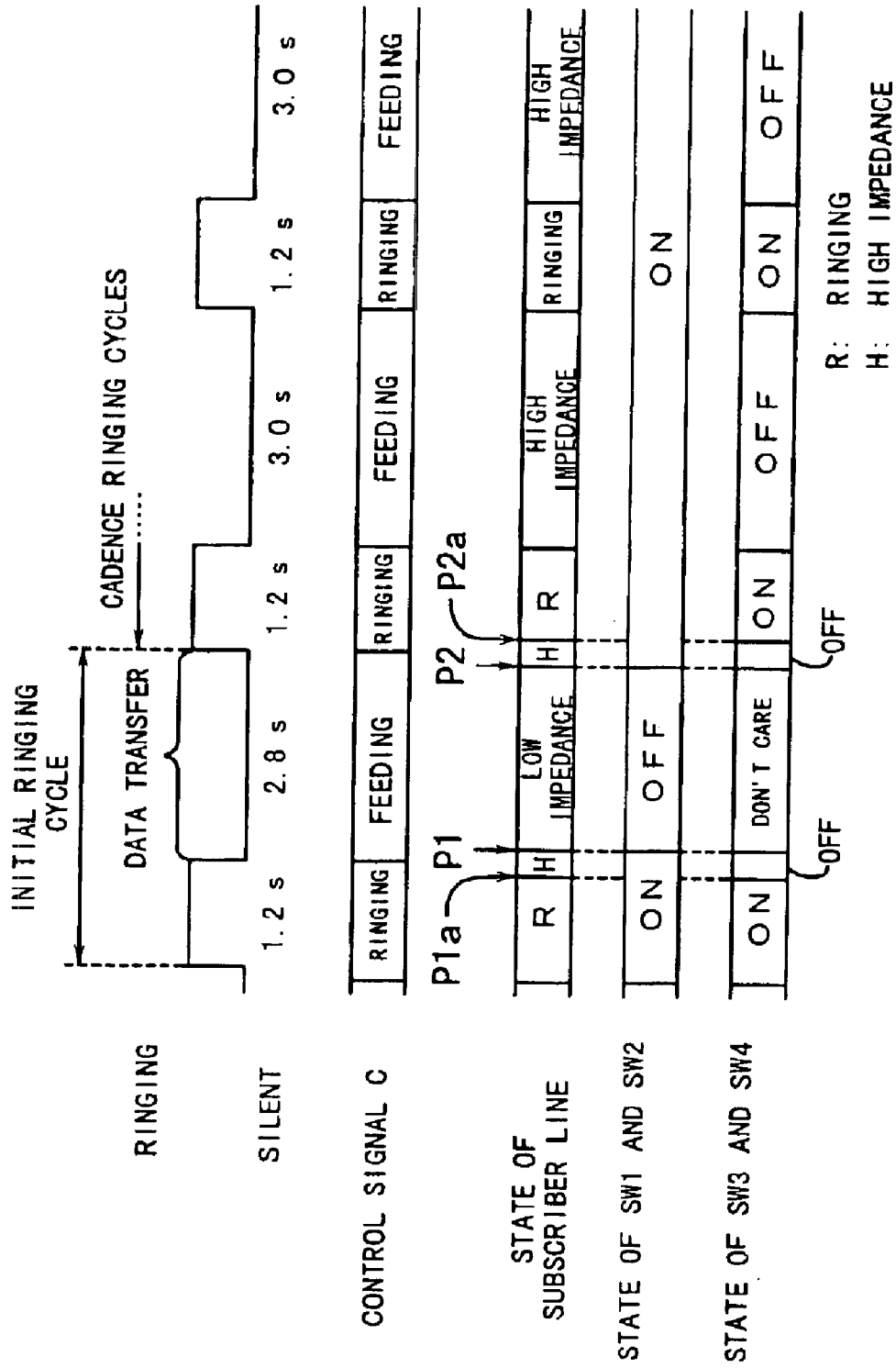
FIGS. 17 to 19 are timing diagrams which show some variations for the ringing signal patterns explained earlier.

Referring next to the timing diagram of FIG. 17, yet another ringing sequence will be described below. Although its appearance resembles the ringing signal pattern discussed in FIG. 3, the ringing sequence illustrated in FIG. 17 is distinct in that a momentary high-impedance feed voltage is inserted at the beginning point and end point of the first silent period that is used to transfer data.

The illustrated ringing signal carries data in the silent period of the initial ringing cycle. The control signal C specifies that the subscriber line will carry an AC ringing signal in ringing periods and feed a DC voltage supply in silent periods. According to this control signal C, the proposed apparatus supplies the subscriber line with a low-impedance feed voltage in the initial silent period to perform a data transfer. The apparatus also provides a momentary high-impedance feed voltage at the beginning point and end point of that silent period (i.e., when the ringing signal varies discontinuously). Further, the subscriber line is driven with a high-impedance feed voltage in each silent period of the cadence cycles, during which no data transfer takes place.

To accomplish the above state switching operation, the four relay switches SW1 to SW4 will be controlled as follows. That is, SW1 and SW2 are set to "ON" until the time point P1 is reached, while SW3 and SW4 are set to "ON" until P1a. SW1 and SW2 are then turned to "OFF" at P1 and kept in that state until P2, during which SW3 and SW4 can be in either state (i.e., "Don't care"). To insert a momentary high impedance state, SW3 and SW4 should be set to "OFF" during two short periods, P1a to P1 and P2 to P2a. After the time point P2, SW1 and SW2 are kept in the "ON" state, whereas SW3 and SW4 are alternately set to "ON" in each ringing period and to "OFF" in each silent period.

The insertion of momentary high impedance state ensures that the ringing signal waveform will vary smoothly at any transitional point between ringing and silent periods, regardless of the execution of data transfer. This means that the ringing signal becomes entirely continuous, thus reducing the production of impulse noises more effectively.

Figure 18:
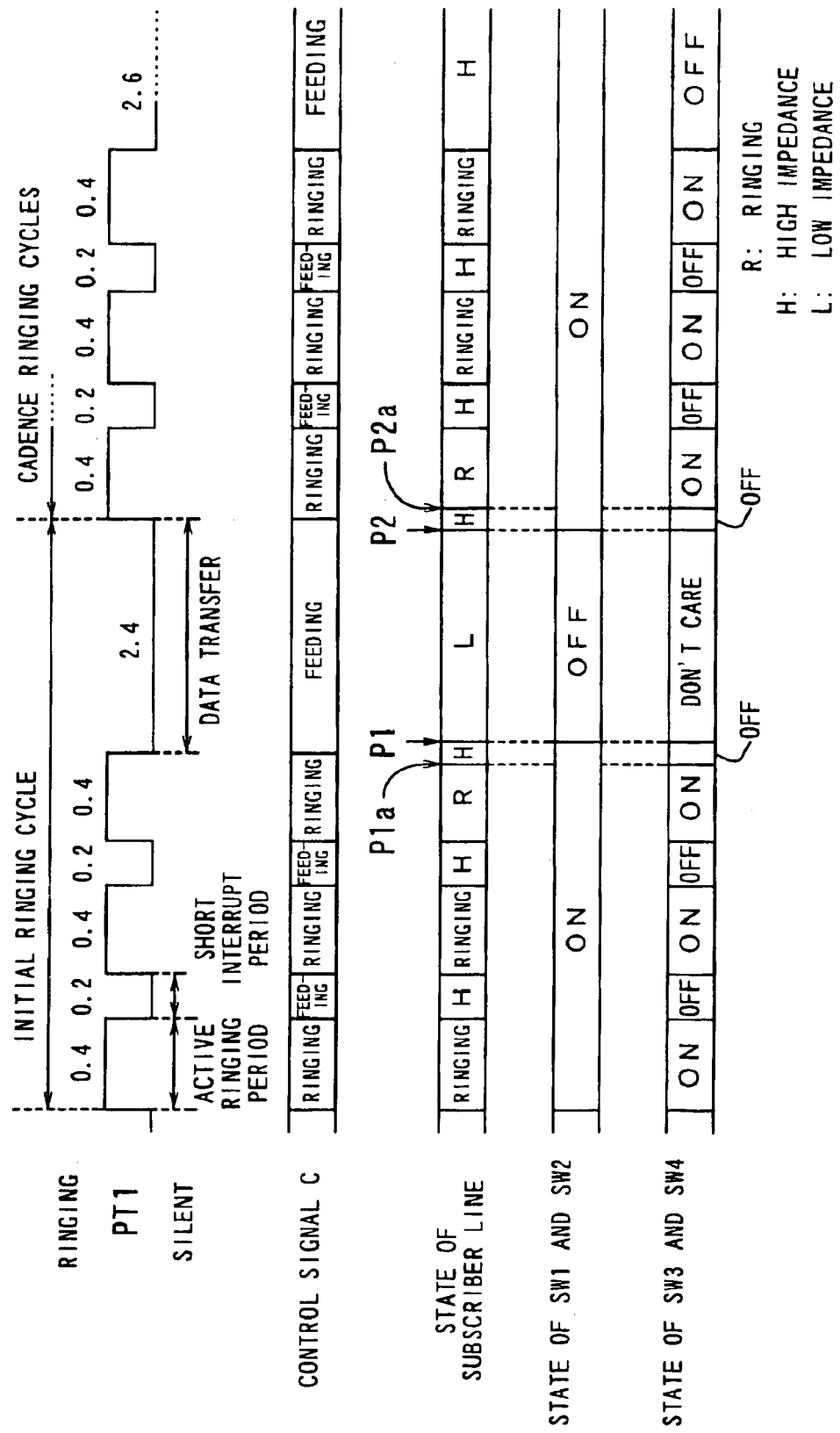

FIG. 18 is a timing diagram showing yet another ringing sequence, a modified version of the ringing signal pattern discussed in FIG. 13. This modified ringing sequence is distinctive in that momentary high-impedance power feeding is inserted at the beginning and end points of the silent period that is used to transfer data.

The ringing signal pattern PT1 exploits the initial silent period to transport data. The control signal C specifies that the subscriber will carry a ringing voltage in each active ringing period and a feed voltage in each short interrupt period. According to this control signal C, the ringing signal sending apparatus drives the subscriber line with a low-impedance feed voltage in the initial silent period to perform a data transfer. The apparatus also provides a momentary high-impedance feed voltage at the beginning and end points of that silent period. Further, it provides the subscriber line with a high-impedance feed voltage in each short interrupt period, as well as in each silent period in the cadence cycles, during which no data transfer takes place.

To accomplish the above state switching operation, the four relay switches SW1 to SW4 will be controlled as follows. That is, both SW1 and SW2 are set to "ON" until the time point P1 is reached. SW3 and SW4, on the other hand, are set to "ON" in each active ringing period and turned to "OFF" in each short interrupt period until the time point P1a is reached. In the data transfer period, P1 to P2, SW1 and SW2 are set to "OFF," while SW3 and SW4 may be in either state (i.e., "Don't care"). To insert a momentary high impedance state, SW3 and SW4 are turned to "OFF" during two short periods, P1a to P1 and P2 to P2a. After the time point P2, SW1 and SW2 are kept in the "ON" state. After the time point P2a (i.e., in the cadence ringing cycles), SW3 and SW4 are alternately set to "ON" in each active ringing period and to "OFF" in each short interrupt period and silent period.

As in the case of FIG. 17, the momentary high impedance power feeding permits the ringing signal waveform to vary smoothly at any transitional point between ringing and silent periods. This means that the ringing signal becomes entirely continuous, thus reducing the production of impulse noises more effectively.

Figure 19:
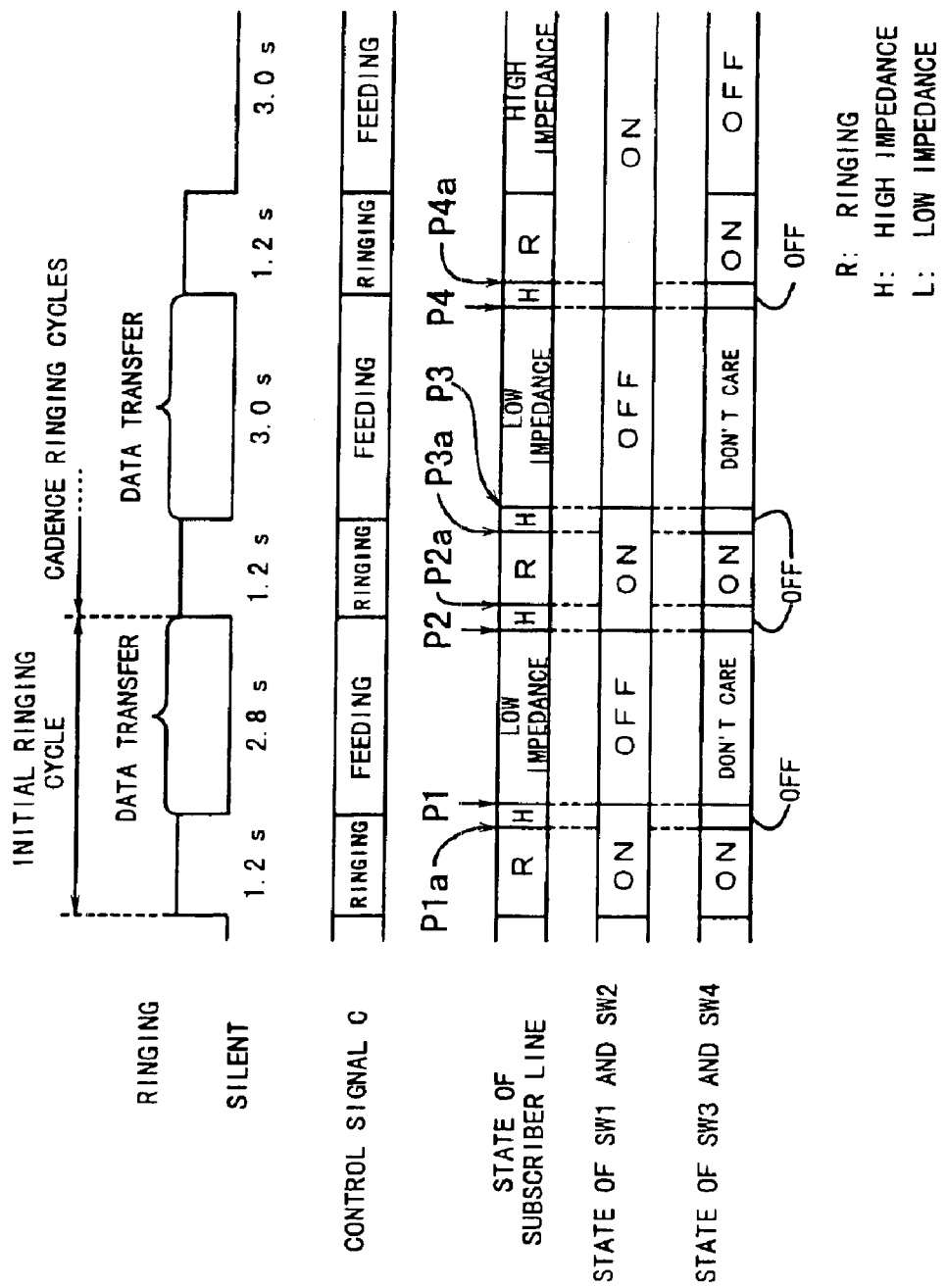
Figure 20:
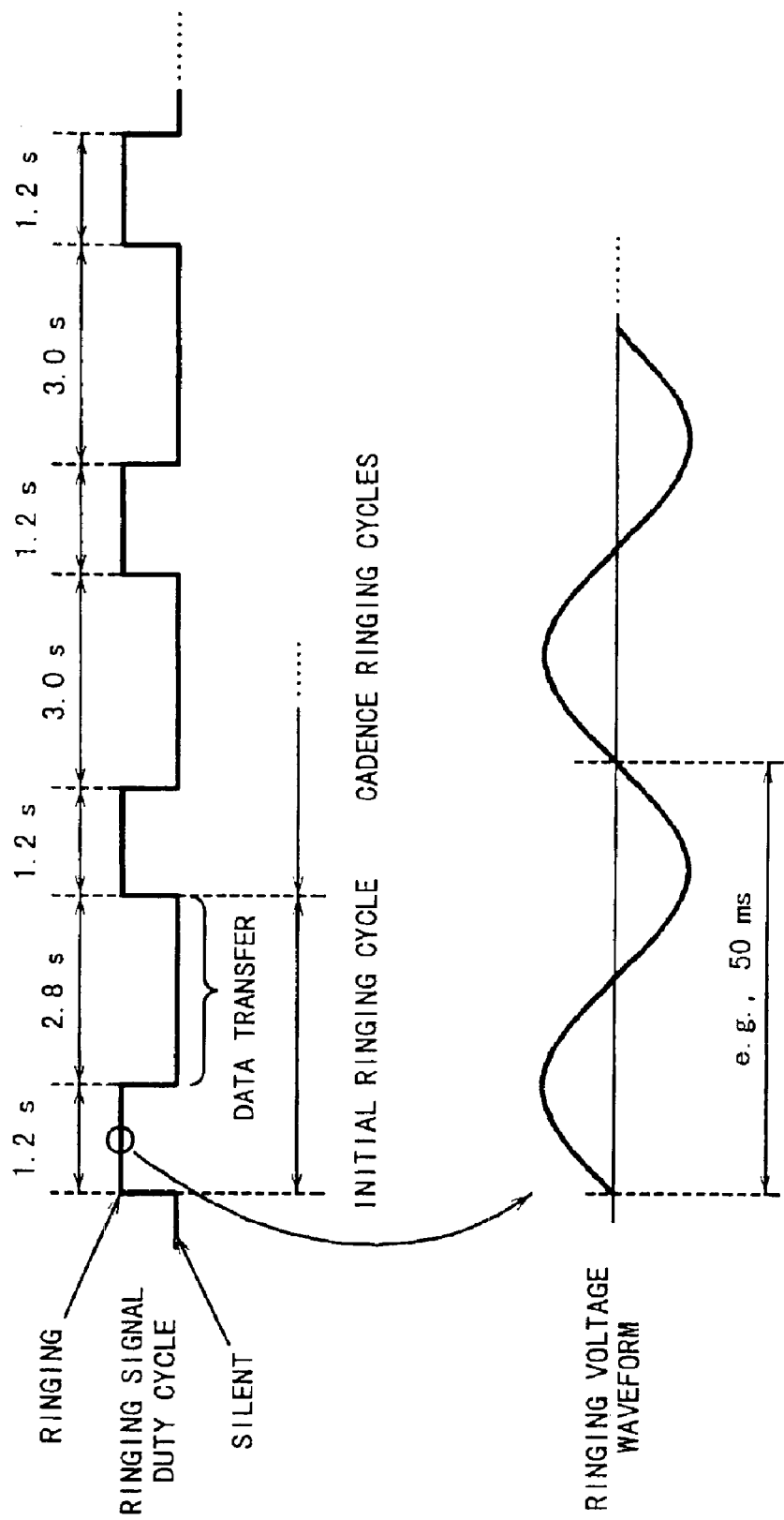
FIG. 20 is a diagram which shows the duty cycle and waveform of a typical ringing signal.
Figure 21:
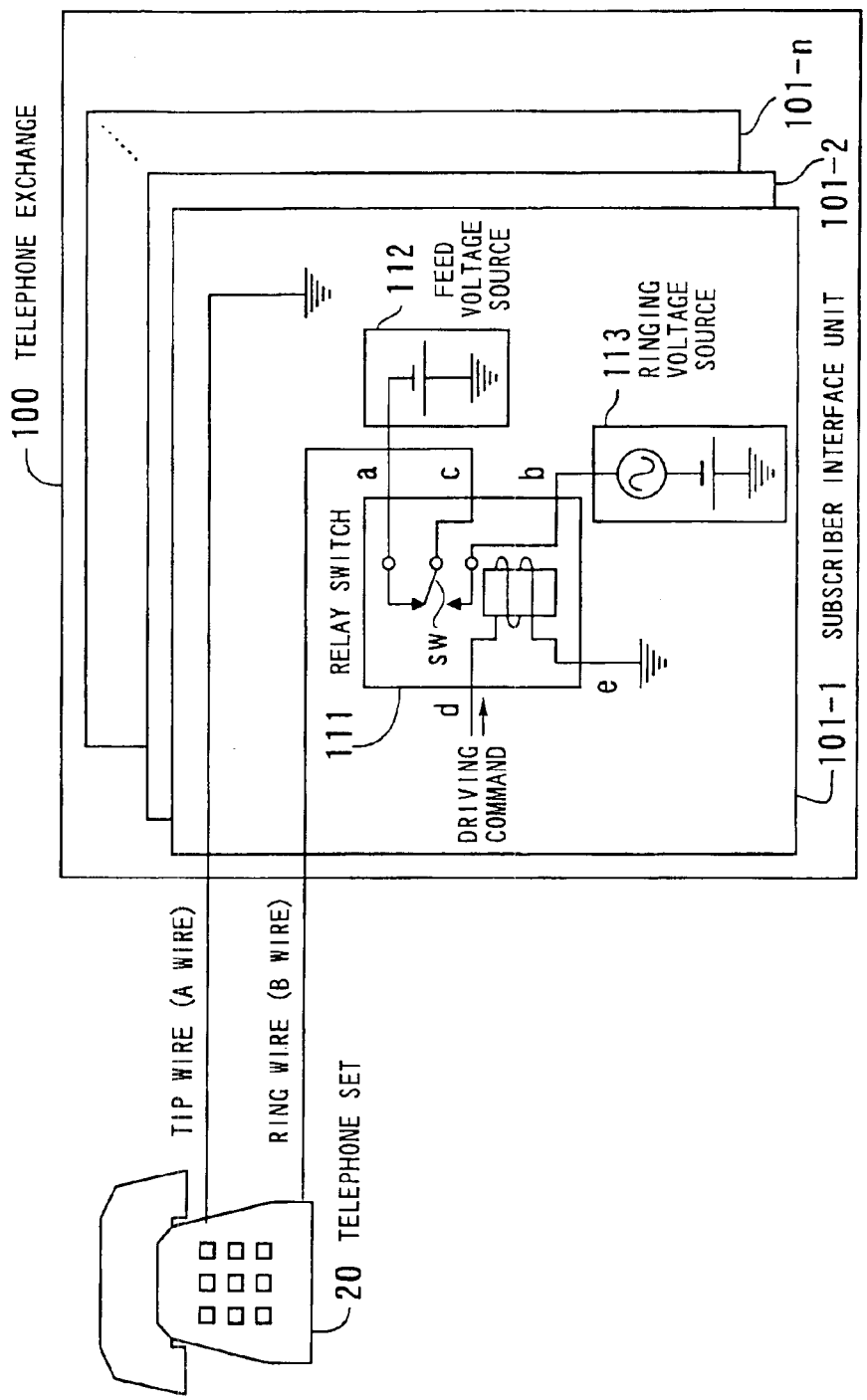
FIG. 21 is a diagram which shows a conventional subscriber interface unit.
Figure 22:
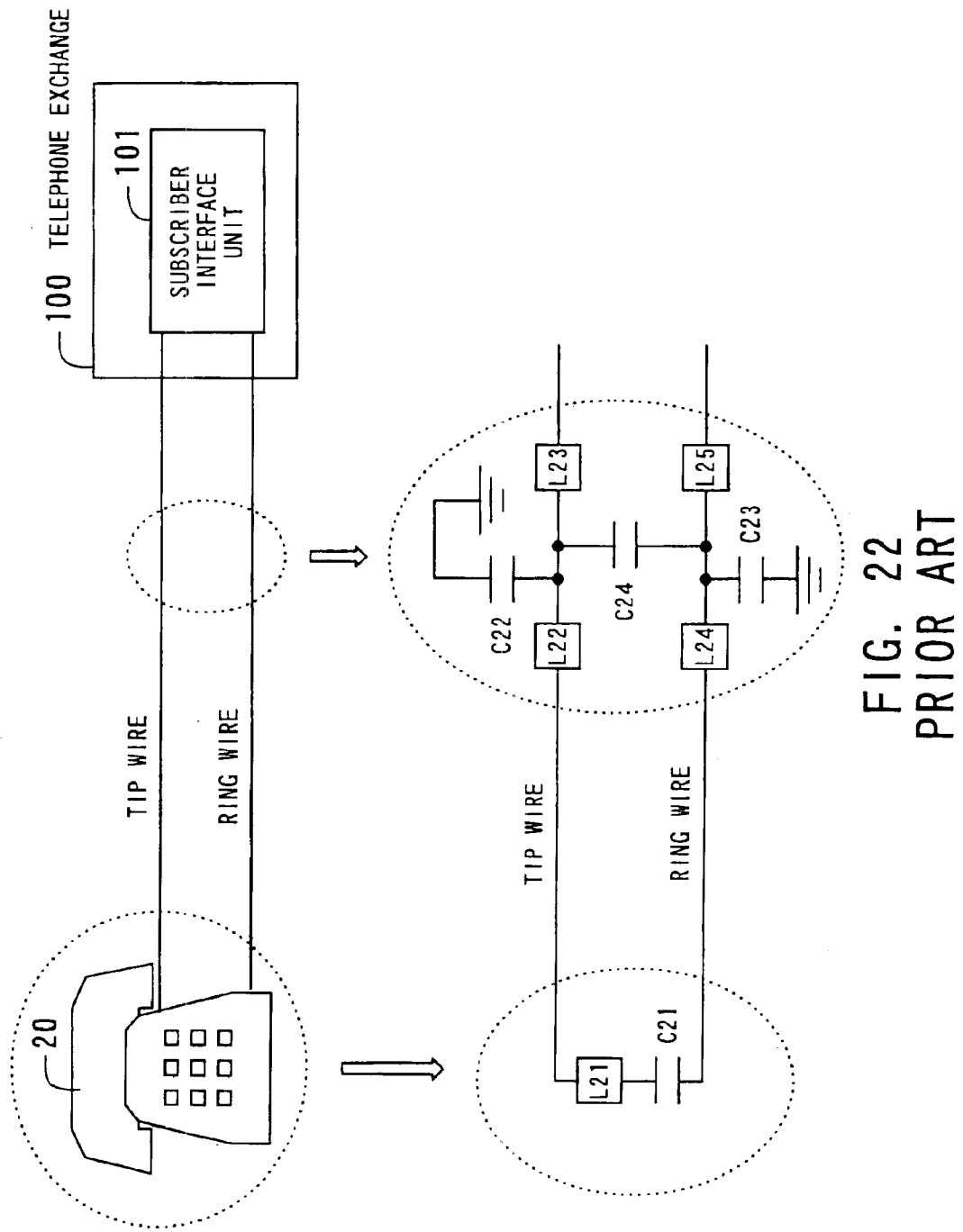
FIG. 22 is a diagram which shows parasitic components on a telephone set and subscriber line.

FIG. 19 is a timing diagram showing still another ringing sequence, a modified version of the ringing signal pattern discussed in FIG. 16. This ringing sequence is distinctive in that a momentary high-impedance feed voltage is inserted at the beginning and end points of the silent period that is used to transfer data.

In this ringing sequence, data is transferred in the following two silent periods: the silent period in the initial ringing cycle and that in the first cadence ringing cycle. The control signal C specifies that the subscriber line will carry a ringing voltage in ringing periods and a feed voltage in silent periods. According to this control signal C, the ringing signal sending apparatus drives the subscriber line with a low-impedance feed voltage in the first two silent periods to perform a data transfer. The apparatus also provides a momentary high-impedance feed voltage at the beginning and end points of each of these silent periods. Further, it provides the subscriber line with a high-impedance feed voltage in the silent period of the second and later cadence ringing cycles.

To accomplish the above state switching operation, the four relay switches SW1 to SW4 will be controlled as follows. That is, SW1 and SW2 are set to "ON" until the time point P1 is reached, while SW3 and SW4 are set to "ON" until P1a. During the first data transfer period, P1 to P2, SW1 and SW2 are set to "OFF." while SW3 and SW4 may be in either state (i.e., "Don't care"). SW1 and SW2 are then turned to "ON" at P2 and kept in that state until P3. SW3 and SW4, on the other hand, are set to "ON" in the ringing period from P2a to P3a. During the second data transfer period, P3 to P4, SW1 and SW2 are set to "OFF," while SW3 and SW4 may be in either state (i.e., "Don't care"). SW1 and SW2 are then turned to "ON" at P4 and kept in that state until the end of the sequence. SW3 and SW4, on the other hand, are set to "ON" in each active ringing period, and to "OFF" in each silent period of the cadence ringing cycles after P4a. Additionally, SW3 and SW4 are turned to "OFF" to insert the following four momentary high impedance periods: P1a to P1, P2 to P2a, P3a to P3, and P4 to P4a.

As in the case of FIG. 18, the momentary high-impedance power feeding permits the ringing signal waveform to vary smoothly at any transitional point between ringing and silent periods. This means that the ringing signal becomes entirely continuous, thus reducing the production of impulse noises more effectively.

The above discussion will now be summarized below. According to the present invention, the ringing signal sending apparatus is configured to supply the subscriber line with a high-impedance feed voltage in particular periods when impulse noises are likely to occur. Besides being implementable only with a few additional components, this feature effectively reduces the development of impulse noises on a subscriber line, as well as the interference or crosstalk to its neighboring channels.

Another point of the present invention is that the proposed ringing signal sending apparatus sets up a data transfer path only when it is required. This feature minimizes the number of silent periods that will be brought into a low impedance state, thus reducing the development of impulse noises during the ringing sequence. Accordingly, the present invention improves the quality of telecommunication services.

The foregoing is considered as illustrative only of the principles of the present invention. Further, since numerous modifications and changes will readily occur to those skilled in the art, it is not desired to limit the invention to the exact construction shown and described, and accordingly, all suitable modifications and equivalents may be regarded as falling within the scope of the invention in the appended claims and their equivalents.

What is claimed is:

1. An apparatus for sending a ringing signal to notify a called terminal of the presence of an incoming call addressed the, comprising:

ringing voltage generating means for generating a ringing voltage;

ringing signal sending means for sending out a ringing signal over a subscriber line by outputting the ringing voltage with a predetermined duty cycle of a ringing period and a silent period;

data transfer means for performing a data transfer to the called terminal over the subscriber line during one of the silent periods;

feed impedance selection means working in conjunction with one or more switches to select a low-impedance feed voltage in the one of the silent periods during which the data transfer is performed, and selecting the a high-impedance feed voltage in the other silent periods during which no data transfer is performed; and feed impedance setting means for providing the high-impedance feed voltage to the subscriber line when said feed impedance selection means selects feeding of the high-impedance feed voltage, wherein the high-impedance feed voltage is realized by inserting a predetermined resistance on the subscriber line in series with a subscriber line circuit (SLIC) that drives the subscriber line, while the low-impedance feed voltage is provided by removing the predetermined resistance from the subscriber line.

2. The apparatus according to claim 1, further comprising path set-up means for establishing a path to the called terminal only when the data transfer is scheduled.

3. The apparatus according to claim 1, wherein:

said ringing voltage generating means comprises a ringing voltage source and a ringing signal bias voltage source; and said feed impedance setting means comprises a resistor coupled to one of said ringing voltage source, said ringing signal bias voltage source, and said ringing voltage generating means itself.

4. The apparatus according to claim 1, wherein said feed impedance selection means selects the high-impedance feed voltage during a short interrupt period which is contained as part of the ringing period.

5. The apparatus according to claim 1, wherein said feed impedance selection means selects the high-impedance feed voltage for a predetermined period at the beginning and end of the one of the silent periods during which the data transfer is performed.

6. An apparatus for sending a ringing signal to inform a caller of the presence of an incoming call addressed thereto, comprising:

ringing voltage generating means for generating a ringing voltage;

ringing signal sending means for sending out a ringing signal over a subscriber line by outputting the ringing voltage with a predetermined duty cycle of a ringing period and a silent period;

feed impedance selection means working in conjunction with one or more switches to select a high-impedance feed voltage in the silent period to drive the subscriber line; and feed impedance setting means for providing the high-impedance feed voltage to the subscriber line when said feed impedance selection means selects feeding of the high-impedance feed voltage, wherein the high-impede feed voltage is realized by inserting a predetermined resistance on the subscriber line in series with a subscriber line circuit (SLIC) that drives the subscriber line.

7. The apparatus according to claim 6, wherein said impedance selection means selects the high-impedance feed voltage during a short interrupt period which is contained as part of the ringing period.

8. An apparatus for sending a ringing signal to notify a called terminal of the presence of an incoming call addressed thereto, comprising:

a ringing voltage generator to generate a ringing voltage;

a ringing signal sender to send out a ringing signal over a subscriber line by outputting the ringing voltage with a predetermined duty cycle of a ringing period and a silent period;

a data transfer unit to perform a data transfer to the called terminal over the subscriber line during one of the silent periods;

a switch controller to control one or more switches;

a feed impedance selector working in conjunction with said switch controller to select a low-impedance feed voltage in the one of the silent periods during which the data transfer is performed, and selecting the a high-impedance feed voltage in the other silent periods during which no data transfer is performed, said selection based on said control of said one or more switches; and a feed impedance setting unit to provide the high-impedance feed voltage to the subscriber line when said feed impedance selection means selects feeding of the high-impedance feed voltage, wherein the high-impedance feed voltage is realized by inserting a predetermined resistance on the subscriber line in series with a subscriber line circuit (SLIC) that drives the subscriber line, while the low-impedance feed voltage is provided by removing the predetermined resistance from the subscriber line.

* * * * *